United States Patent

Hosono et al.

[11] Patent Number: 5,884,549
[45] Date of Patent: Mar. 23, 1999

[54] LINEAR ACTUATOR

[75] Inventors: Masayuki Hosono; Hiroshi Miyachi, both of Tokyo; Yoshiteru Ueno, Ibaraki-ken; Toshio Sato, Tsukuba, all of Japan

[73] Assignee: SMC Kabushiki Kaisha, Tokyo, Japan

[21] Appl. No.: 855,903

[22] Filed: May 14, 1997

[30] Foreign Application Priority Data

Aug. 13, 1996 [JP] Japan .................................. 8-213743
Sep. 12, 1996 [JP] Japan .................................. 8-242368

[51] Int. Cl.⁶ ........................... F01B 31/12; F15B 15/24
[52] U.S. Cl. ............................... 92/5 R; 92/13.7; 92/88; 92/146; 92/163; 92/165 PR
[58] Field of Search .......................... 91/1; 92/5 R, 13.7, 92/165 R, 165 PR, 88, 146, 163, 161

[56] References Cited

U.S. PATENT DOCUMENTS

| | | | |
|---|---|---|---|
| 5,308,168 | 5/1994 | Yamaguchi et al. | 384/45 |
| 5,335,583 | 8/1994 | Kaneko et al. | 92/13.7 |
| 5,363,741 | 11/1994 | Takada et al. | 92/165 PR |
| 5,411,334 | 5/1995 | Takei et al. | 384/45 |
| 5,555,798 | 9/1996 | Rosengren et al. | 92/88 |
| 5,617,772 | 4/1997 | Hosono et al. | 92/5 R |

FOREIGN PATENT DOCUMENTS

| | | |
|---|---|---|
| 0603459-A2 | 6/1993 | European Pat. Off. |
| 0704275-A2 | 9/1995 | European Pat. Off. |
| 0713748-A1 | 11/1995 | European Pat. Off. |
| 2-31902 | 2/1990 | Japan |
| 5-42716 | 6/1993 | Japan |
| 6-43302 | 6/1994 | Japan |
| 6-47708 | 6/1994 | Japan |
| 2-62113 | 11/1995 | Japan |

OTHER PUBLICATIONS

Japanese Publication Entitled "An Introduction To Mechanical Pneumatics", Chapter 6.13: Hydro–Pneumatic Feed Unit.

Primary Examiner—F. Daniel Lopez
Attorney, Agent, or Firm—Morgan & Finnegan, L.L.P.

[57] ABSTRACT

A linear actuator comprising a guide section formed along a longitudinal direction to protrude on a bottom surface of a slide table, a pair of guide blocks formed mutually opposingly and seperated from each other by a predetermined spacing distance on an upper surface of the main cylinder body, attachment holes for attaching the main cylinder body to another member in any direction of attachment from a side of the slide table or from a side of the main cylinder body, and an adjuster bolt for adjusting an amount of displacement of the slide table.

20 Claims, 42 Drawing Sheets

PRIOR ART

PRIOR ART

LINEAR ACTUATOR

BACKGROUND OF THE INVENTION

1. Field of the Invention

The present invention relates to a linear actuator for reciprocating a slide table along an axial direction of a main cylinder body by introducing a pressurized fluid through a fluid inlet/outlet port.

2. Description of the Related Art

Linear actuators, for example, fluid pressure-operated cylinders have been hitherto used as means for transporting workpieces or the like. The linear actuator comprises a slide table which is linearly reciprocated along a main cylinder body so that a workpiece placed on the slide table is transported.

A linear actuator concerning a conventional technique is based on a technical concept disclosed in, for example, Japanese Laid-Open Utility Model Publication No. 5-42716. As shown in FIGS. 39A and 39B, the fluid pressure-operated cylinder 1 comprises a main cylinder body 2 and a guide rail 3 formed to protrude on an upper surface of the main cylinder body 2 along a longitudinal direction.

The fluid pressure-operated cylinder 1 includes a slide table 4 which is slidably displaceable along the guide rail 3 in accordance with a displacement action of a piston accommodated in a cylinder chamber. Ball-circulating holes (not shown) for rolling a plurality of unillustrated bearing balls are defined in the slide table 4 along the longitudinal direction of the slide table 4. Screw holes 5a to 5d for attaching a workpiece are defined through an upper surface of the slide table 4. A pair of attachment holes 6a, 6b for attaching and securing the main cylinder body 2 to another member (not shown) are defined at corners located diagonally on the main cylinder body 2.

In the case of the fluid pressure-operated cylinder 1 shown in FIGS. 39A and 39B, the width L of the main cylinder body 2 in its transverse direction is represented by $L \approx L_1 + (L_2 \times 2)$ ($L_1$: width of the guide rail 3, $L_2$: diameter of the attachment holes 6a, 6b). Namely, the width L of the main cylinder body 2 approximately has a value obtained by adding the width $L_1$ of the guide rail 3 to the diameters $L_2$ of the two attachment holes 6a, 6b. In this arrangement, it is impossible to reduce the width $L_1$ of the guide rail 3 because the rigidity of the slide table 4 is decreased. Consequently, the width L of the main cylinder body 2 has a value obtained by adding the width $L_1$ of the guide rail 3 to the diameters $L_2$ of the attachment holes 6a, 6b.

As described above, in the case of the fluid pressure-operated cylinder 1 concerning this conventional technique, the width L of the main cylinder body 2 cannot be reduced because of the influence of the width $L_1$ of the guide rail 3. As a result, the fluid pressure-operated cylinder 1 has an inconvenience in that the entire cylinder apparatus fails in achievement of a compact size and a light weight.

A linear actuator concerning another conventional technique is based on a technical concept disclosed in, for example, Japanese Laid-Open Utility Model Publication No. 6-43302. As shown in FIG. 40, the fluid pressure-operated cylinder 7 comprises a cylinder body 8 and a table 10. The cylinder body 8 includes a cylinder chamber formed therein. The table 10 is movable along an axial direction of the cylinder body 8 in accordance with a guiding action of a linear guide 9 secured to an upper surface of the cylinder body 8. A first protrusion 11 is formed to protrude upwardly at one end located in a transverse direction of the cylinder body 8. Second and third protrusions 12, 13 are formed to protrude laterally on one side surface located in the transverse direction of the table 10 so that the first protrusion 11 is interposed between the second and third protrusions 12, 13.

In this arrangement, bolts 14, 15, which are screwed into the second and third protrusions 12, 13 respectively, abut against the first protrusion 11. Thus terminal positions of movement of the table 10 are regulated. The amount of movement of the table 10 is adjusted by adjusting the screwing amounts of the bolts 14, 15.

However, in the case of the fluid pressure-operated cylinder 7 concerning the another conventional technique shown in FIG. 40, the first to third protrusions 11, 12, 13, which function to adjust the amount of movement of the table 10, are formed to protrude outwardly along the transverse direction of the fluid pressure-operated cylinder 7. Accordingly, the fluid pressure-operated cylinder 7 has an inconvenience in that it is impossible to reduce with width L in the transverse direction of the fluid pressure-operated cylinder 7 including the table 10, and the entire cylinder apparatus fails in achievement of a compact size and a light weight, in the same manner as the fluid pressure-operated cylinder 1 concerning the foregoing conventional technique.

Further, in the case of the fluid pressure-operated cylinders 1, 7 concerning the conventional techniques shown in FIGS. 39A, 39B, and 40, the width $L_1$ of the guide rail 3 and the width $L_2$ of the linear guide 7 are formed to be relatively small as compared with widths L of the main cylinder bodies (cylinder bodies) 2, 8. For this reason, an inconvenience arises in that linear accuracy of the slide tables 4, 10 is deteriorated by loads applied horizontally to the slide table (table) 4, 10.

A linear actuator concerning still another conventional technique is based on a technical concept disclosed in, for example, Japanese Laid-Open Utility Model Publication No. 6-47708. As shown in FIGS. 41 and 42, the fluid pressure-operated cylinder 16 comprises a main cylinder body 17 including a linear rolling bearing 16a formed to protrude at its central portion, and a table 18 which is linearly reciprocatable in accordance with a guiding action of the linear rolling bearing 16a.

A permanent magnet 18a is secured to one side surface of the table 18. A guide rail 18c is fastened to one side surface of the main cylinder body 17 by the aid of a pair of screws 18b, 18b. An elongated groove 18d is formed in the guide rail 18c along its axial direction. The position of the table 18 is detected by sensing a magnetic action of the permanent magnet 18a by using a magnetic proximity switch 19 installed at a predetermined position in the elongated groove 18d.

A pair of fluid pressure supply ports 19a, 19a (one of them is not illustrated), which are used to screw unillustrated tube fittings thereinto and connect piping tubes (not shown), are formed at positions close to the guide rail 18c on one side surface of the main cylinder body 17.

However, in the case of the fluid pressure-operated cylinder 16, the guide rail 18c, to which the magnetic proximity switch 19 is installed, is fastened to the one side surface of the main cylinder body 17 by means of the screws 18d, 18d. Accordingly, it is necessary to form screw holes for screwing the screws 18d, 18d thereinto, on the side surface of the main cylinder body 17. Therefore, it is necessary that the thickness M between an inner wall surface of the cylinder chamber and an outer wall surface of the main cylinder body 17 (see FIG. 42) is formed to be thick, in order to bore the screw holes. As a result, it is impossible to reduce the width W in the transverse direction of the main cylinder body 17. Thus a difficulty arises in that it is impossible to allow the entire apparatus to have a compact size and a light weight.

In the case of the fluid pressure-operated cylinder 16 concerning the conventional technique, an inconvenience arises in that the guide rail 18c, which protrudes outwardly as compared with the fluid pressure supply ports 19a, 19a, is obstructive, and thus the piping operation becomes complicated when the tube fittings are screwed in order to connect the piping tubes to the fluid pressure supply ports 19a, 19a of the main cylinder body 17.

SUMMARY OF THE INVENTION

A general object of the present invention is to provide a linear actuator which makes it possible to reduce the width in the transverse direction of a main cylinder body and allow the entire apparatus to have a compact size and a light weight.

A principal object of the present invention is to provide a linear actuator which makes it possible to maintain linear accuracy of a slide table even if a load is applied substantially horizontally to the slide table.

Another object of the present invention is to provide a linear actuator which makes it possible to perform piping operation conveniently.

Still another object of the present invention is to provide a linear actuator which makes it possible to reduce the width in the transverse direction of a main cylinder body without deteriorating linear accuracy of a slide table.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
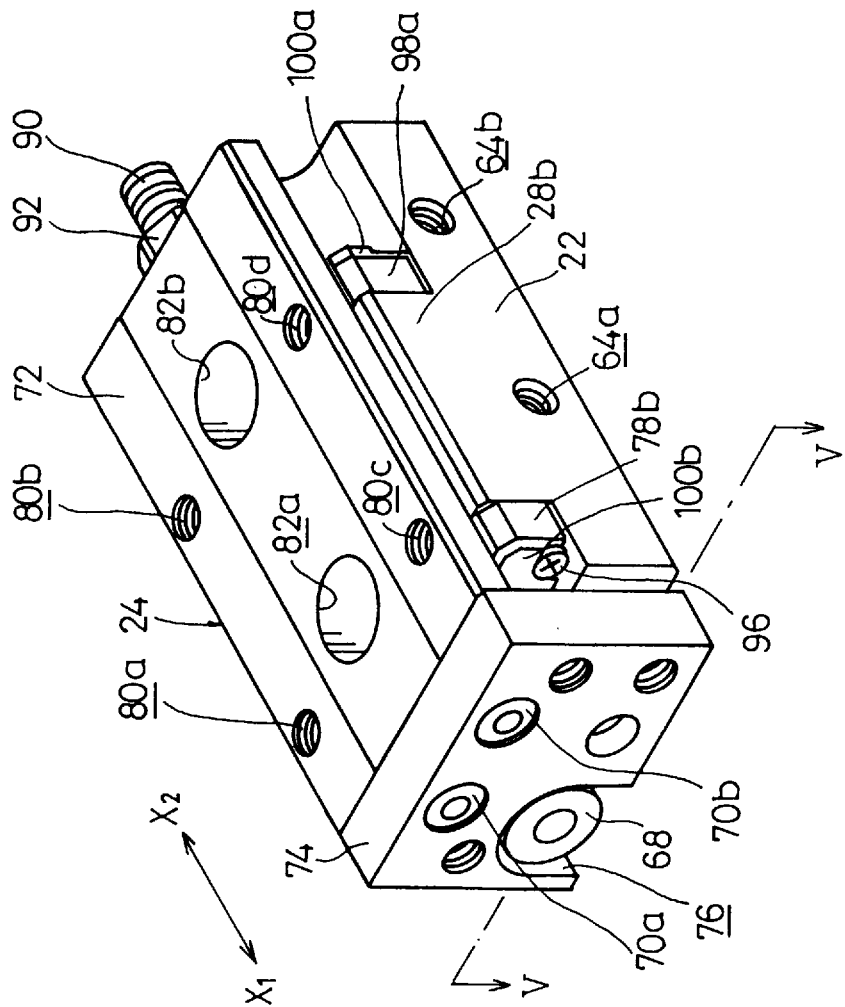
FIG. 1 shows a perspective view illustrating a linear actuator according to a first embodiment of the present invention.

With reference to FIG. 1, reference numeral 20 indicates a linear actuator according to a first embodiment of the present invention. The linear actuator 20 comprises a main cylinder body 22 for constructing a cylinder mechanism, a slide table 24 which is linearly reciprocatable along a longitudinal direction of the main cylinder body 22, and a guide mechanism 26 (see FIG. 2) for smoothly reciprocating the slide table 24 along the longitudinal direction of the main cylinder body 22.

Figure 2:
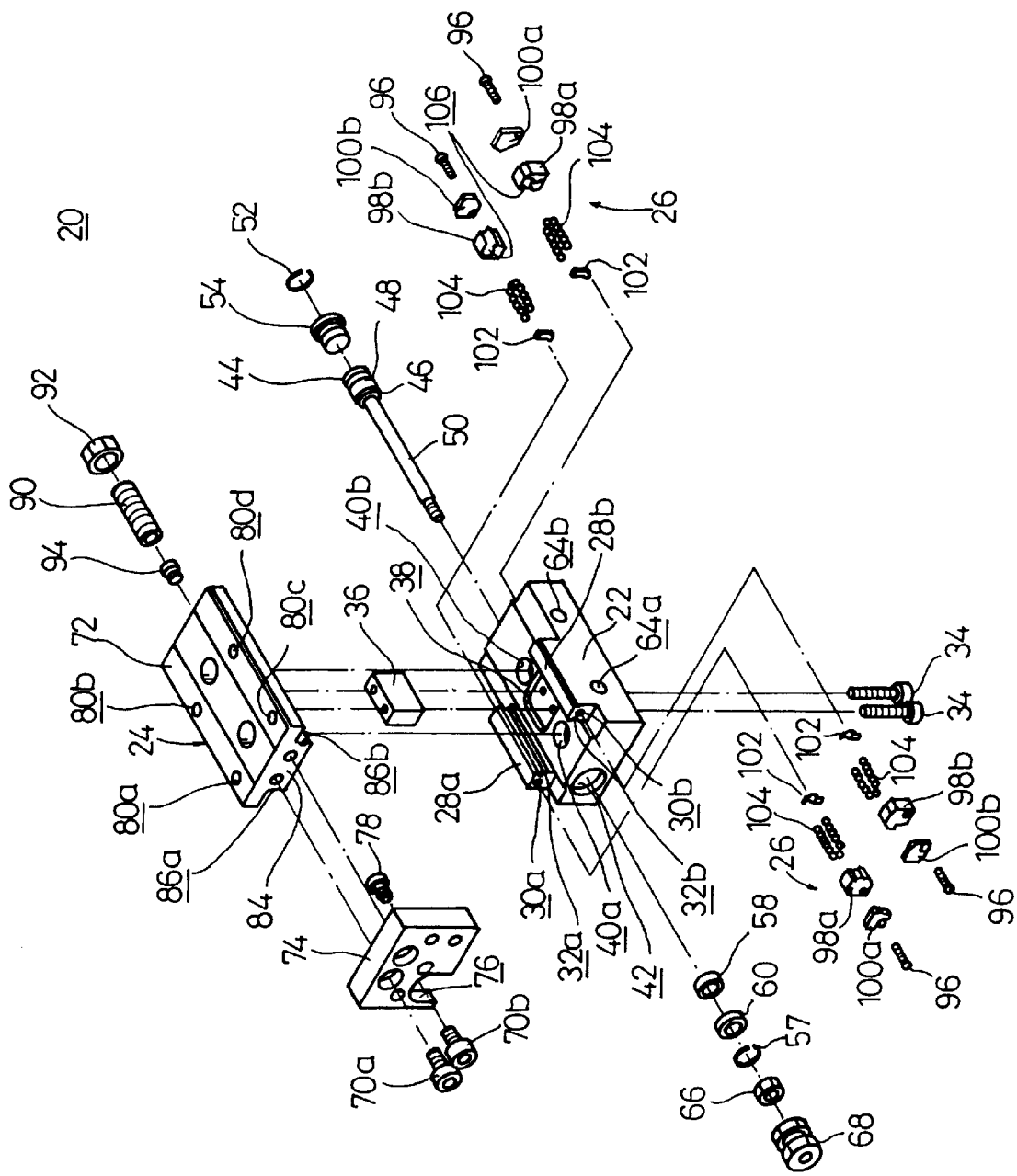
FIG. 2 shows an exploded perspective view illustrating the linear actuator shown in FIG. 1.

As shown in FIG. 2, a pair of guide blocks 28a, 28b, which are separated by a predetermined spacing distance and opposed to one another along a transverse direction, are formed integrally with the main cylinder body 22 to protrude on an upper surface of the main cylinder body 22. Ball-circulating holes 30a, 30b and ball-rolling grooves 32a, 32b, which are described later on, are defined in the pair of guide blocks 28a, 28b along the longitudinal direction respectively.

Figure 4:
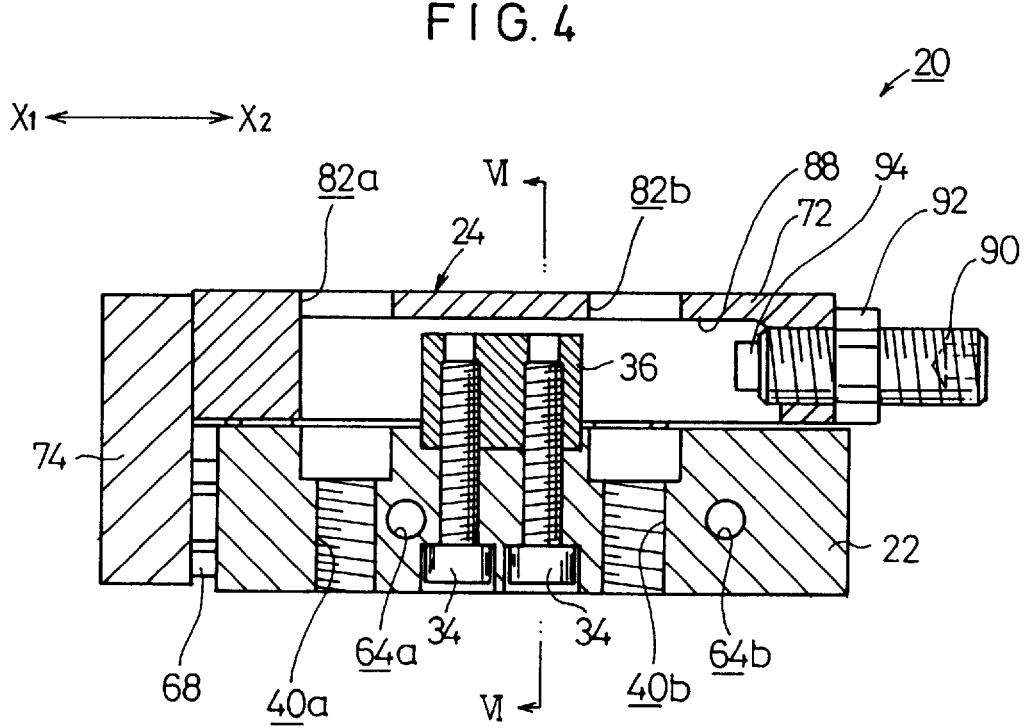
FIG. 4 shows a vertical cross-sectional view taken along a line IV—IV in FIG. 3.

A positioning recess 38, which is provided for fixing a rectangular parallelepiped-shaped stopper block 36 by means of screws 34, is defined at an approximately central position between the pair of guide blocks 28a, 28b. A pair of attachment holes 40a, 40b, which penetrate through the main cylinder body 22 in a direction substantially perpendicular to the axis, are defined at positions closely near to the positioning recess 38 (see FIG. 4). A through hole 42, which penetrates through the main cylinder body 22 along the longitudinal direction, is defined in the main cylinder body 22 (see FIG. 5). The through hole 42 is deviated by a predetermined distance toward a side of the one guide block 28a from the axis of the main cylinder body 22.

Figure 5:
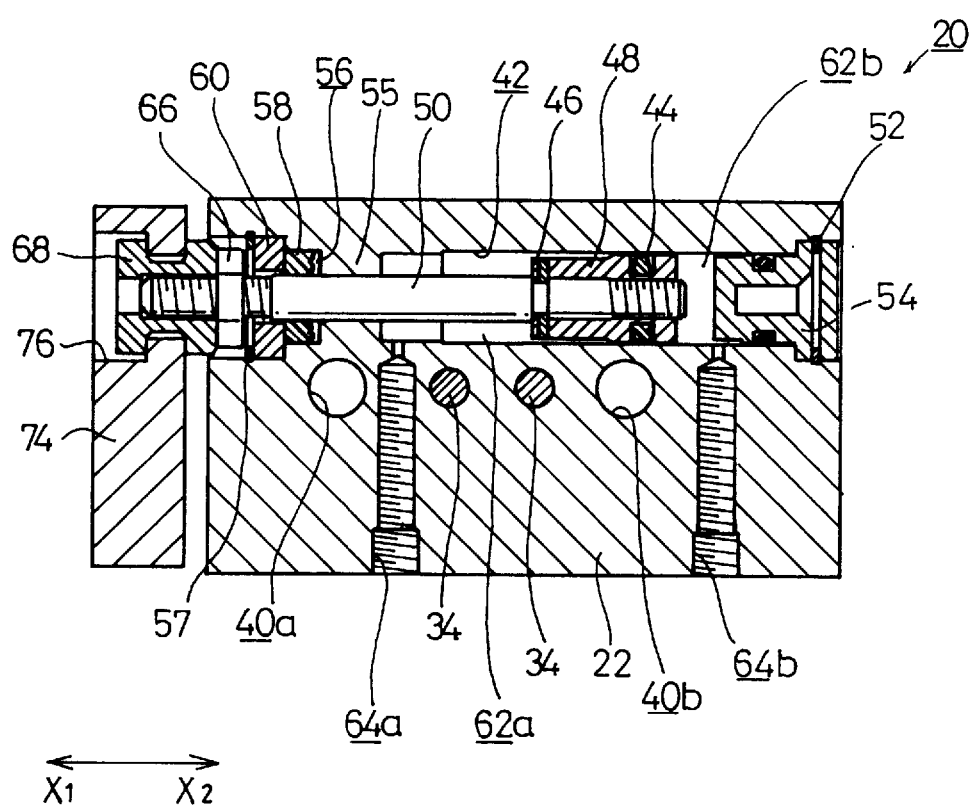
FIG. 5 shows a lateral cross-sectional view taken along a line V—V in FIG. 1.

As shown in FIG. 5, a piston 48 and a piston rod 50 are accommodated in the through hole 42. The piston 48 is installed with a seal ring 44 and a damper 46 on its outer circumferential surface. The piston rod 48 is connected to the piston 48. One end of the through hole 42 is closed in an air-tight manner by means of an end cap 54 installed by the aid of a retaining ring 52. An annular bulge 55 for surrounding the outer circumferential surface of the piston rod 50 is formed at the other end of the through hole 42. The other end of the through hole 42 is closed in an air-tight manner by means of a collar 60 and a rod packing 58 held to a hole 56 communicating with the through hole 42 by the aid of a retaining ring 57.

In this embodiment, cylinder chambers 62a, 62b are defined by the annular bulge 55 and the end cap 54 for closing the through hole 42. The cylinder chambers 62a, 62b are formed to communicate with a pair of fluid inlet/outlet ports 64a, 64b defined through one side surface of the main cylinder body 22 respectively. A floating bush 68 is connected to a front end of the piston rod 50 through a lock nut 66.

The slide table 24 comprises a table 72 and an end plate 74 which are fastened by screws perpendicularly to provide an L-shaped cross section by the aid of a pair of bolts 70a, 70b. The floating bush 68 is held by a semicircular hole 76 defined in the end plate 74. A buffer member 78 (see FIG. 2) is inserted into a hole defined in the end plate 74. The buffer member 78 functions to relieve the shock generated when the end plate 74 abuts against the end surface of the main cylinder body 22 at one terminal position within a displacement region of the slide table 24.

The table 72 is defined with four workpiece-holding holes 80a to 80d and a pair of through holes 82a, 82b corresponding to and communicating with the attachment holes 40a, 40b of the main cylinder body 22. Therefore, the main cylinder body 22 may be attached to another member by screwing unillustrated bolts into the attachment holes 40a, 40b from an upper surface side of the table 72 through the through holes 82a, 82b. Alternatively, the main cylinder body 22 may be attached by directly screwing the bolts into the attachment holes 40a, 40b from a bottom surface side of the main cylinder body 22. As described above, an operator can select any of attachment directions of the linear actuator 20 from upward and downward directions.

Figure 6:
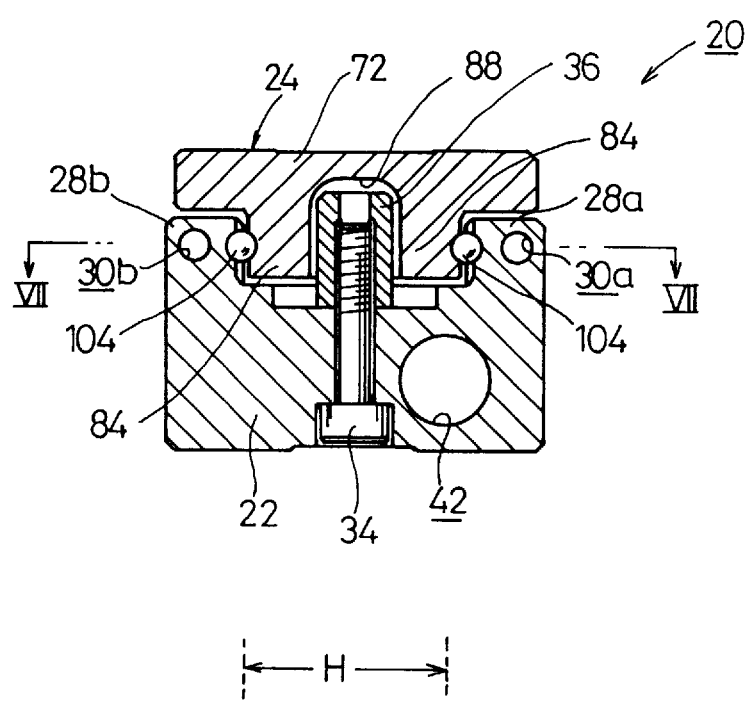
FIG. 6 shows a vertical cross-sectional view taken along a line VI—VI in FIG. 4.
Figure 7:
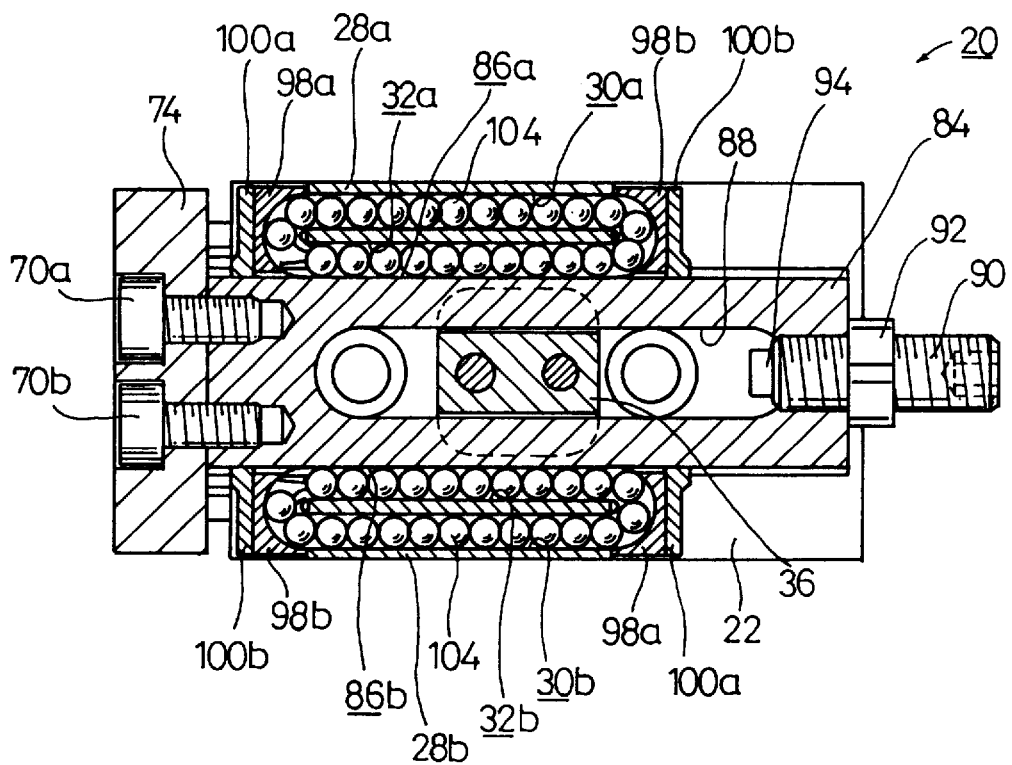
FIG. 7 shows a lateral cross-sectional view taken along a line VII—VII in FIG. 6.

A guide section 84, which extends along the longitudinal direction, is integrally formed to protrude on the central portion of the bottom surface of the slide table 24. The ball-rolling grooves 86a, 86b are defined along the longitudinal direction through opposing side surfaces located in the transverse direction of the guide section 84. A cutout 88, which corresponds to the shape of the stopper block 36 and extends over a predetermined length along the axial direction, is formed in the guide section 84 (see FIGS. 4 and 6). An adjuster bolt 90, which functions as a displacement amount-adjusting member for the slide table 24, is screwed at one end of the cutout 88 by the aid of a lock nut 92. A buffer member 94, which is composed of, for example, rubber such as urethane, is installed to a front end of the adjuster bolt 90.

Figure 3:
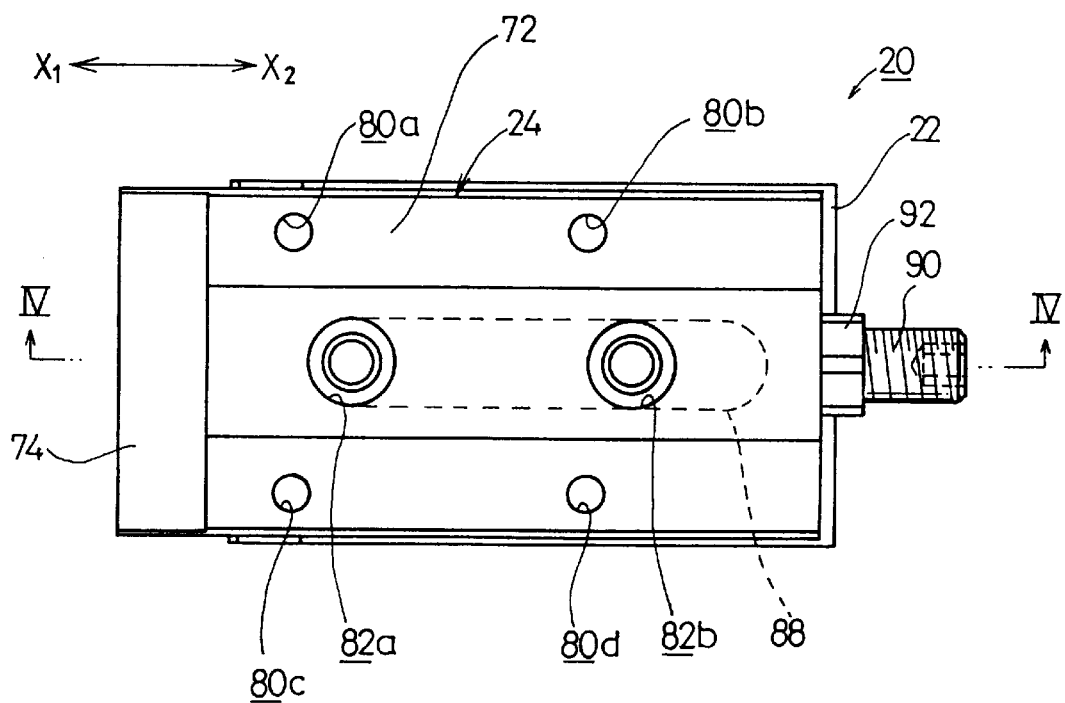
FIG. 3 shows a plan view illustrating the linear actuator shown in FIG. 1.

In this embodiment, the adjuster bolt 90 is displaced integrally with the slide table 24. The displacement amount of the slide table 24 is regulated by abutment of the buffer member 94 against the stopper block 36 (see FIG. 4). The adjuster bolt 90 and the buffer member 94 are provided on a side of the end and approximately at the central position in the transverse direction of the slide table 24 (see FIG. 3). Accordingly, it is possible to decrease any biased load applied to the slide table 24 when the slide table 24 arrives at its terminal position of displacement. As a result, a plurality of bearing balls (rolling elements) 104, which function as a linear guide, can be prevented from any action of moment caused by the biased load.

As shown in FIG. 2, the guide mechanism 26 comprises the pair of guide blocks 28a, 28b integrally formed with the main cylinder body 22 in an expanded manner, and covers 98a, 98b and scrapers 100a, 100b installed to both ends of the guide blocks 28a, 28b by means of screws 96 respectively. The ball-circulating holes 30a, 30b, which penetrate through the guide blocks 28a, 28b along the longitudinal direction, are defined in the guide blocks 28a, 28b. The ball-rolling grooves 32a, 32b, which extend along the longitudinal direction, are defined on mutually opposing inner wall surfaces of the guide blocks 28a, 28b.

The guide mechanism 26 further comprises return guides 102 which are installed to the both ends of the guide blocks 28a, 28b respectively to make communication between the ball-circulating holes 30a, 30b and the ball-rolling grooves 32a, 32b, and a plurality of bearing balls 104 which roll along the ball-circulating holes 30a, 30b and the ballrolling grooves 32a, 32b. Recesses 106 are defined on the covers 98a, 98b, which connect the ball-circulating holes 30a, 30b and the ball-rolling grooves 32a, 32b and function as circulating tracks for the bearing balls 104.

The linear actuator 20 according to the first embodiment of the present invention is basically constructed as described above. Next, its operation, function, and effect will be explained.

At first, a pressurized fluid is introduced into one fluid inlet/outlet port 64b from an unillustrated fluid pressure supply source. In this state, the other fluid inlet/outlet port 64a is open to the atmospheric air by operating an unillustrated directional control valve.

The pressurized fluid is supplied to one cylinder chamber 62b communicating with the fluid inlet/outlet port 64b, and it presses the piston 48 in a direction of an arrow $X_1$ (see FIG. 5). The end plate 74, which is engaged with the piston rod 50, is displaced in the direction of the arrow $X_1$ in accordance with the pressing action of the piston 48. The slide table 24 is displaced integrally with the end plate 74 in accordance with the rolling action of the bearing balls 104.

The buffer member 94, which is installed to the adjuster bolt 90 displaced together with the slide table 24, abuts against the stopper block 36 during the process of displacement of the slide table 24 toward the direction of the arrow $X_1$. Thus the slide table 24 arrives at the terminal position of the displacement region. In this embodiment, the displacement amount of the slide table 24 can be changed increasingly or decreasingly by loosening the lock nut 92 and adjusting the screwing amount of the adjuster bolt 90.

When the slide table 24 is displaced in a direction opposite to the direction described above, the pressurized fluid is supplied to the other fluid inlet/outlet port 64a. The supplied pressurized fluid is introduced into the other cylinder chamber 62a, and it presses the piston 48 in a direction of an arrow $X_2$. The slide table 24 is displaced in the direction of the arrow $X_2$ by the aid of the end plate 74 engaged with the piston rod 50 in accordance with the pressing action of the piston 48. The slide table 24 arrives at the terminal position in the displacement region when the buffer member 78 provided on the end plate 74 abuts against the end surface of the main cylinder body 22.

In the case of the linear actuator 20 according to the first embodiment, the guide section 84 is integrally formed in an expanded manner along the longitudinal direction on the central portion of the bottom surface of the slide table 24. Further, the guide blocks 28a, 28b, which slidably contact with the guide section 84 through the bearing balls 104, are integrally formed in an expanded manner on the upper surface of the main cylinder body 22. Therefore, unlike the conventional technique shown in FIGS. 39A and 39B, the attachment holes 40a, 40b can be bored at desired positions in the main cylinder body 22 without being affected by the width H of the guide section 84 in the transverse direction (see FIG. 6).

As described above, the width H of the main cylinder body 22 in the transverse direction can be reduced in the linear actuator 20 according to this embodiment, as compared with the conventional technique. As a result, the entire apparatus is allowed to have a compact size and a light weight.

In the case of the linear actuator 20 according to this embodiment, the adjuster bolt 90, which functions as the displacement amount-adjusting member for the slide table 24, is provided in conformity with the cutout 88 formed at the approximately central portion of the bottom surface of the slide table 24. Accordingly, the width H of the main cylinder body 22 in the transverse direction can be further reduced, as compared with the another conventional technique shown in FIG. 40 in which the first to third protrusions 11, 12, 13 protrude outwardly from one side surface of the slide table 24. Moreover, it is possible to decrease the biased load generated at the terminal position in the displacement region of the slide table 24. Thus it is possible to transport the workpiece in a stable manner.

Figure 8:
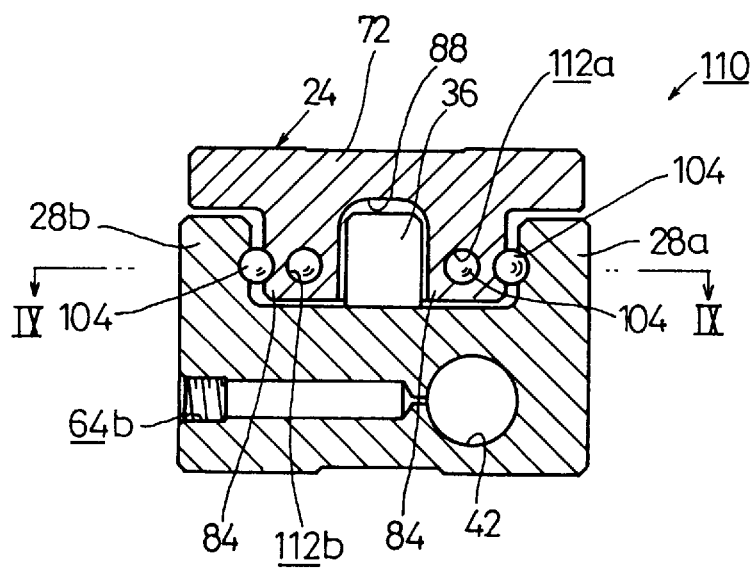
FIG. 8 shows a vertical cross-sectional view illustrating a linear actuator according to a second embodiment of the present invention.
Figure 9:
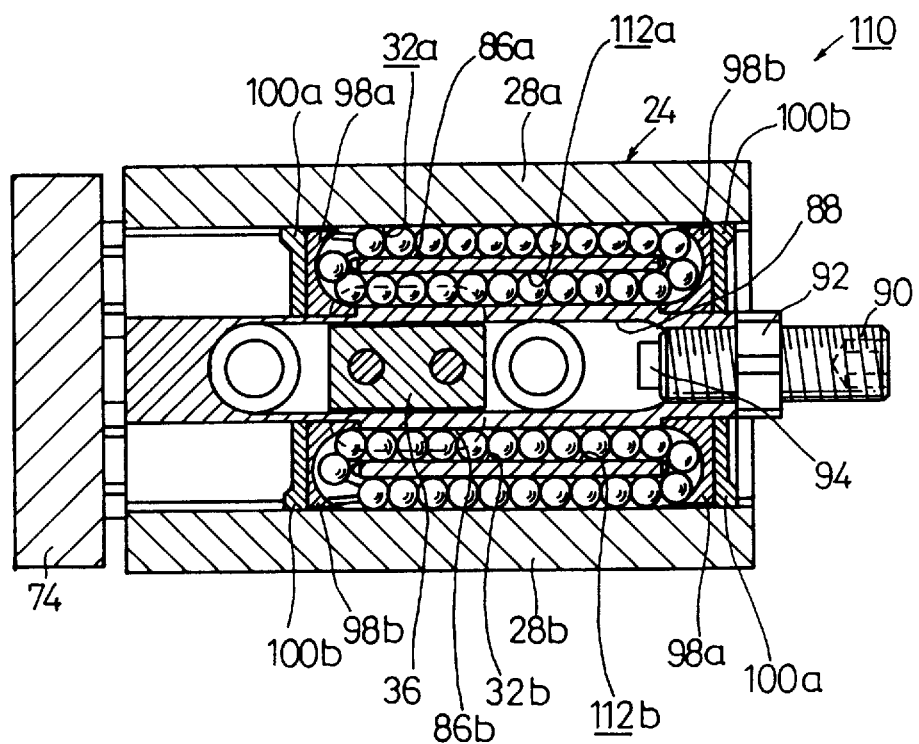
FIG. 9 shows a lateral cross-sectional view taken along a line IX—IX in FIG. 8.
Figure 10:
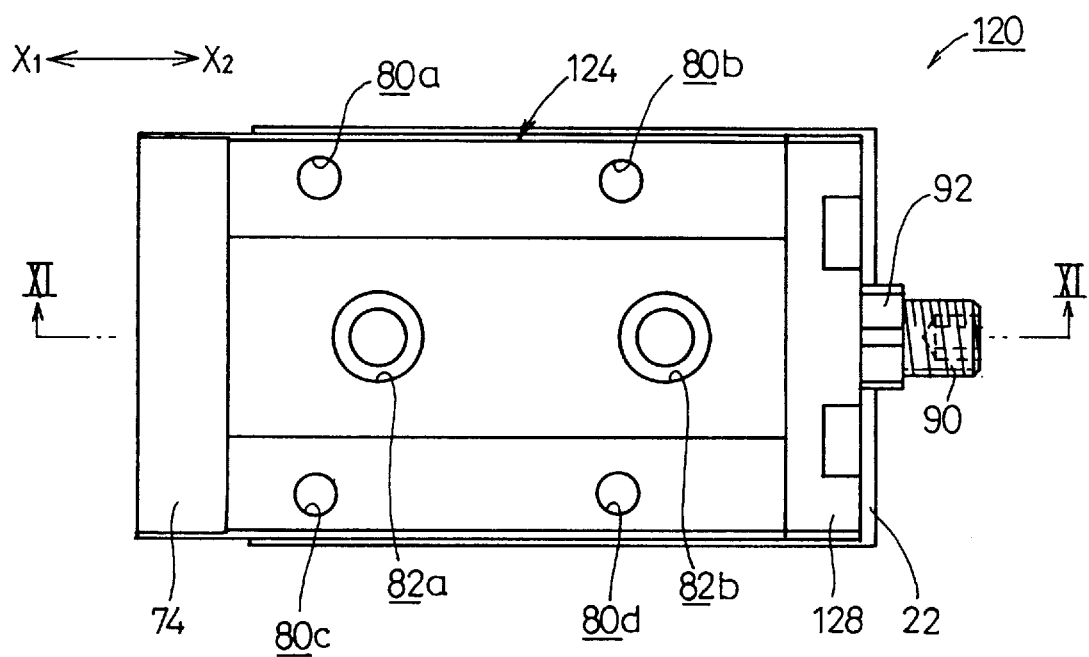
FIG. 10 shows a plan view illustrating a linear actuator according to a third embodiment of the present invention.
Figure 11:
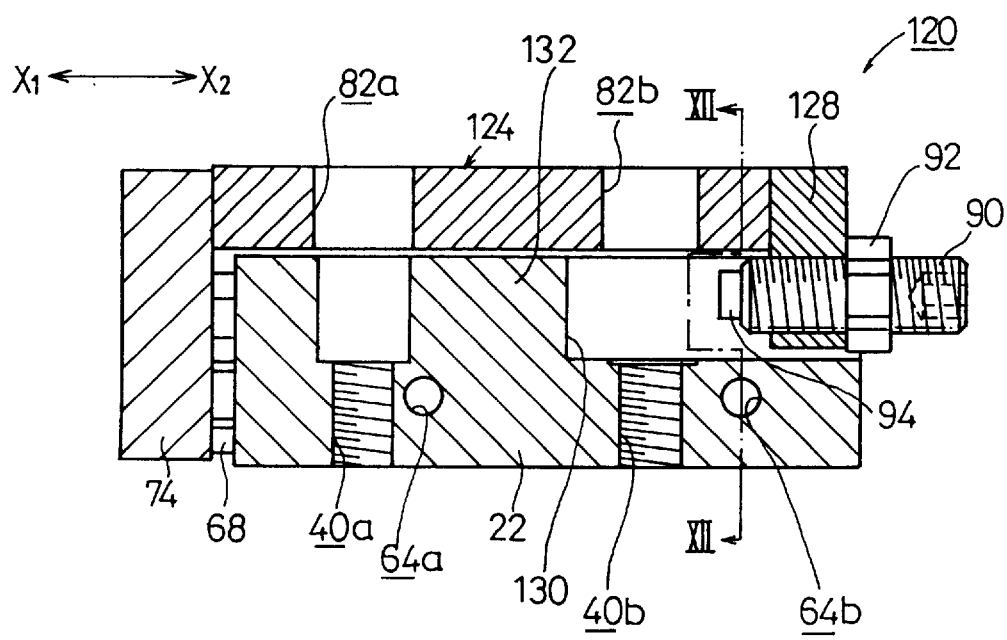
FIG. 11 shows a vertical cross-sectional view taken along a line XI—XI in FIG. 10.

Next, a linear actuator 110 according to a second embodiment of the present invention is shown in FIGS. 8 and 9. In the following embodiments, the same constitutive elements as those of the foregoing will be designated by the same reference numerals, and only different constitutive elements will be explained.

In the case of the linear actuator 20 according to the first embodiment, the ball-circulating holes 30a, 30b are defined in the respective guide blocks 28a, 28b. However, the linear actuator 110 according to the second embodiment is different from the linear actuator 20 according to the first embodiment in that a pair of ball-circulating holes 112a, 112b are defined in the guide section 84 of the slide table 24 substantially in parallel to the ball-rolling grooves 86a, 86b.

As a result, the following difference occurs. Namely, the linear actuator 20 according to the first embodiment is constructed so that the plurality of bearing balls 104 circulate at the outside of the slide table 24 via the sliding sections between the guide section 84 and the guide blocks 28a, 28b. On the contrary, in the case of the linear actuator 110 according to the second embodiment, the bearing balls 104 circulate at the inside of the slide table 24 via the sliding sections between the guide section 84 and the guide blocks 28a, 28b.

Next, a linear actuator 120 according to a third embodiment of the present invention is shown in FIGS. 10 to 13.

Figure 12:
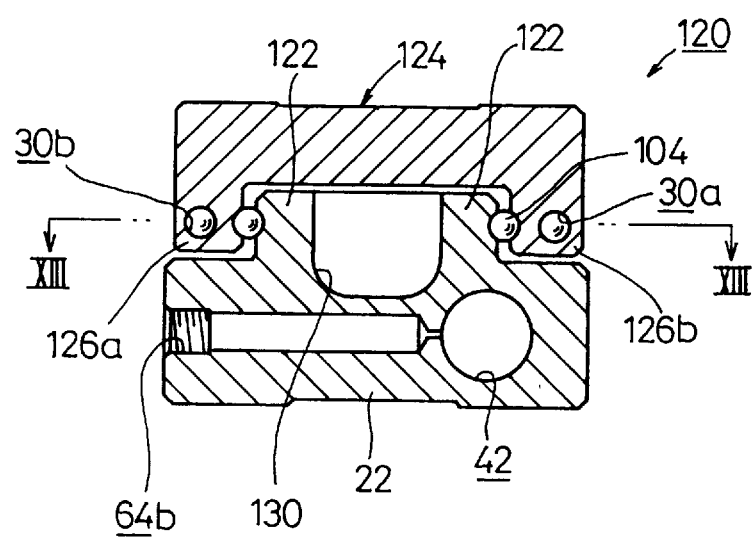
FIG. 12 shows a vertical cross-sectional view taken along a line XII—XII in FIG. 11.
Figure 13:
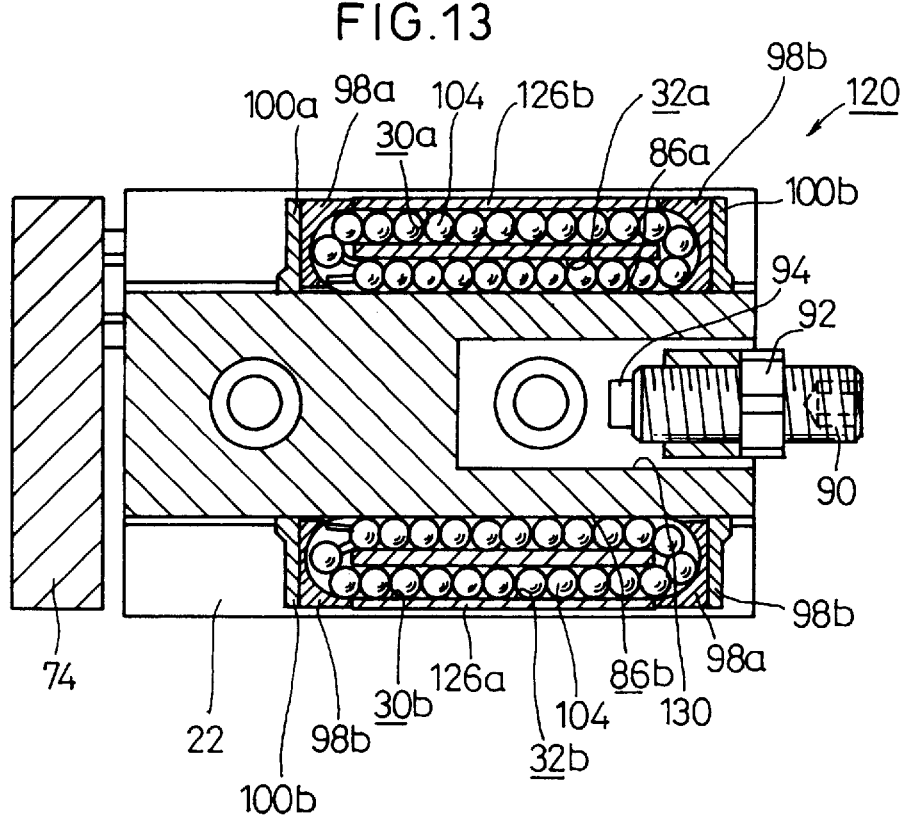
FIG. 13 shows a lateral cross-sectional view taken along a line XIII—XIII in FIG. 12.
Figure 14:
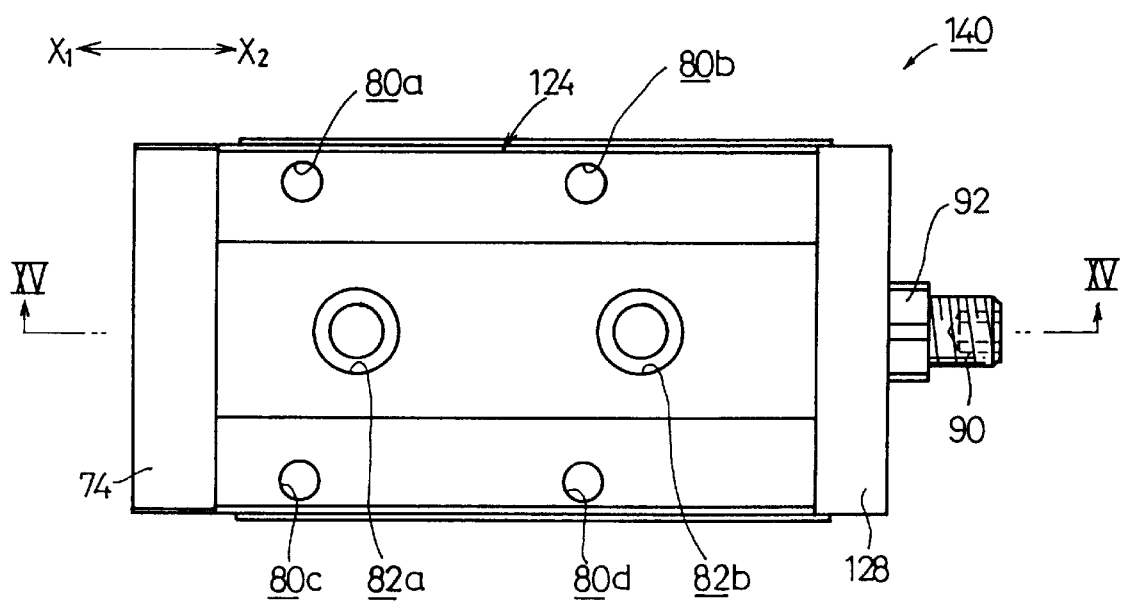
FIG. 14 shows a plan view illustrating a linear actuator according to a fourth embodiment of the present invention.
Figure 15:
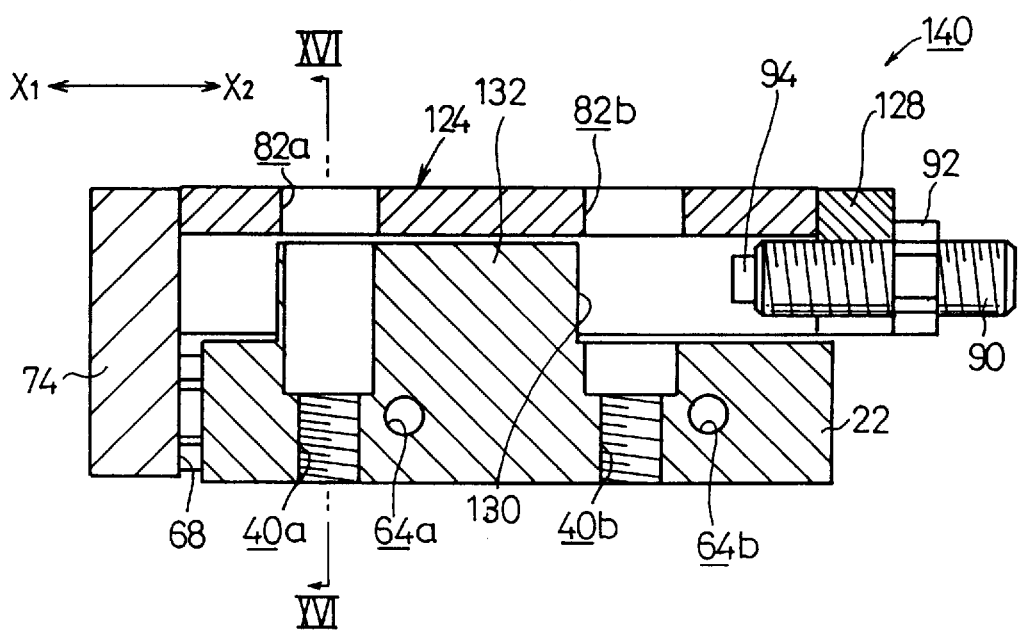
FIG. 15 shows a vertical cross-sectional view taken along a line XV—XV in FIG. 14.

As shown in FIG. 12, the linear actuator 120 according to the third embodiment is different from the linear actuators 20, 110 according to the first and second embodiments in the following points. Namely, a guide section 122 is formed to protrude along the axial direction at a central portion on an upper surface of a main cylinder body 22. Further, guide blocks 126a, 126b are formed to protrude at both ends in the transverse direction of a slide table 124 respectively.

As a result, in the case of the linear actuator 120 according to the third embodiment, a plurality of bearing balls 104 circulate at the outside of the main cylinder body 22 via sliding sections between the guide blocks 126a, 126b and the guide section 122. Reference numeral 128 indicates a holding block for holding the adjuster bolt 90, which is screwed to one end of the slide table 124.

In the case of the linear actuators 20, 110 according to the first and second embodiments, the stopper block 36 is formed separately from the main cylinder body 22, and the former is fastened to the latter by means of screws. However, the linear actuator 120 according to the third embodiment is different form the linear actuators 20, 110 according to the first and second embodiments in that a cutout 130 is formed by cutting out the guide section 122 of the main cylinder body 22, and a stopper block 132 is formed integrally with the main cylinder body (see FIG. 11).

Next, a linear actuator 140 according to a fourth embodiment of the present invention is shown in FIGS. 14 to 17.

Figure 16:
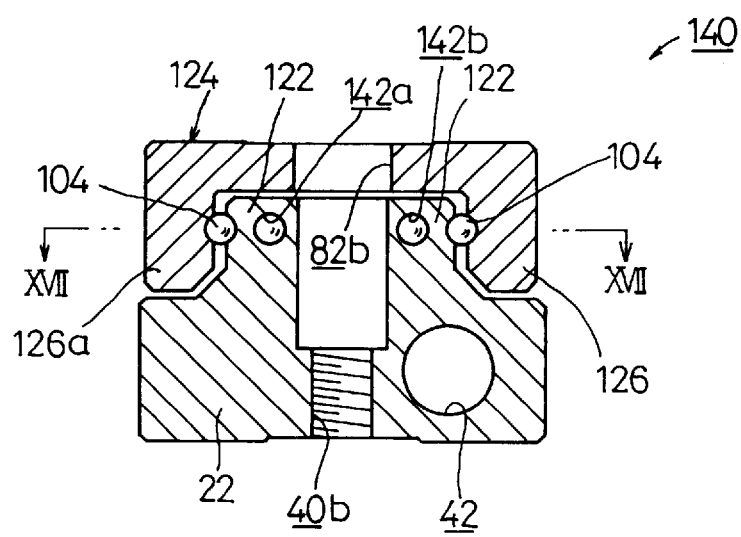
FIG. 16 shows a vertical cross-sectional view taken along a line XVI—XVI in FIG. 15.
Figure 17:
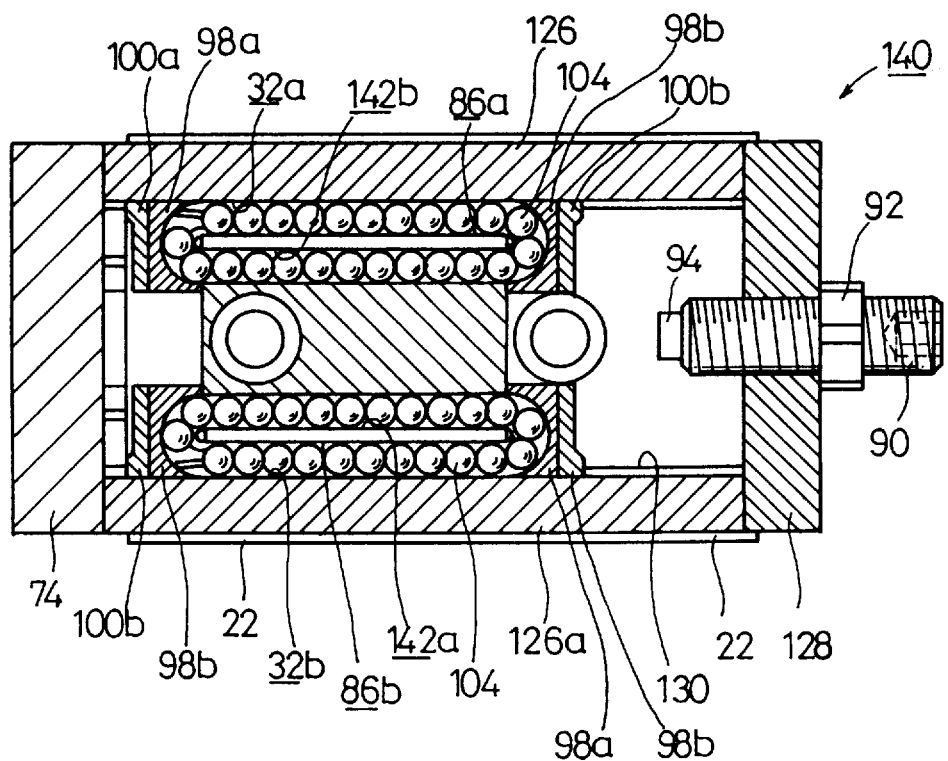
FIG. 17 shows a lateral cross-sectional view taken along a line XVII—XVII in FIG. 16.

As shown in FIG. 16, in the case of the linear actuator 140 according to the fourth embodiment, a pair of ball-circulating holes 142a, 142b are defined in a guide section 122 of a main cylinder body 22. Thus bearing balls 104 circulate at the inside of the main cylinder body 22 via sliding sections between guide blocks 126a, 126b and the guide section 122.

The linear actuators 110, 120, 140 according to the second to fourth embodiments have their functions and effects equivalent to those of the linear actuator 20 according to the first embodiment, explanation of which will be omitted.

Next, a linear actuator 220 according to a fifth embodiment of the present invention is shown in FIGS. 18 to 23.

Figure 19:
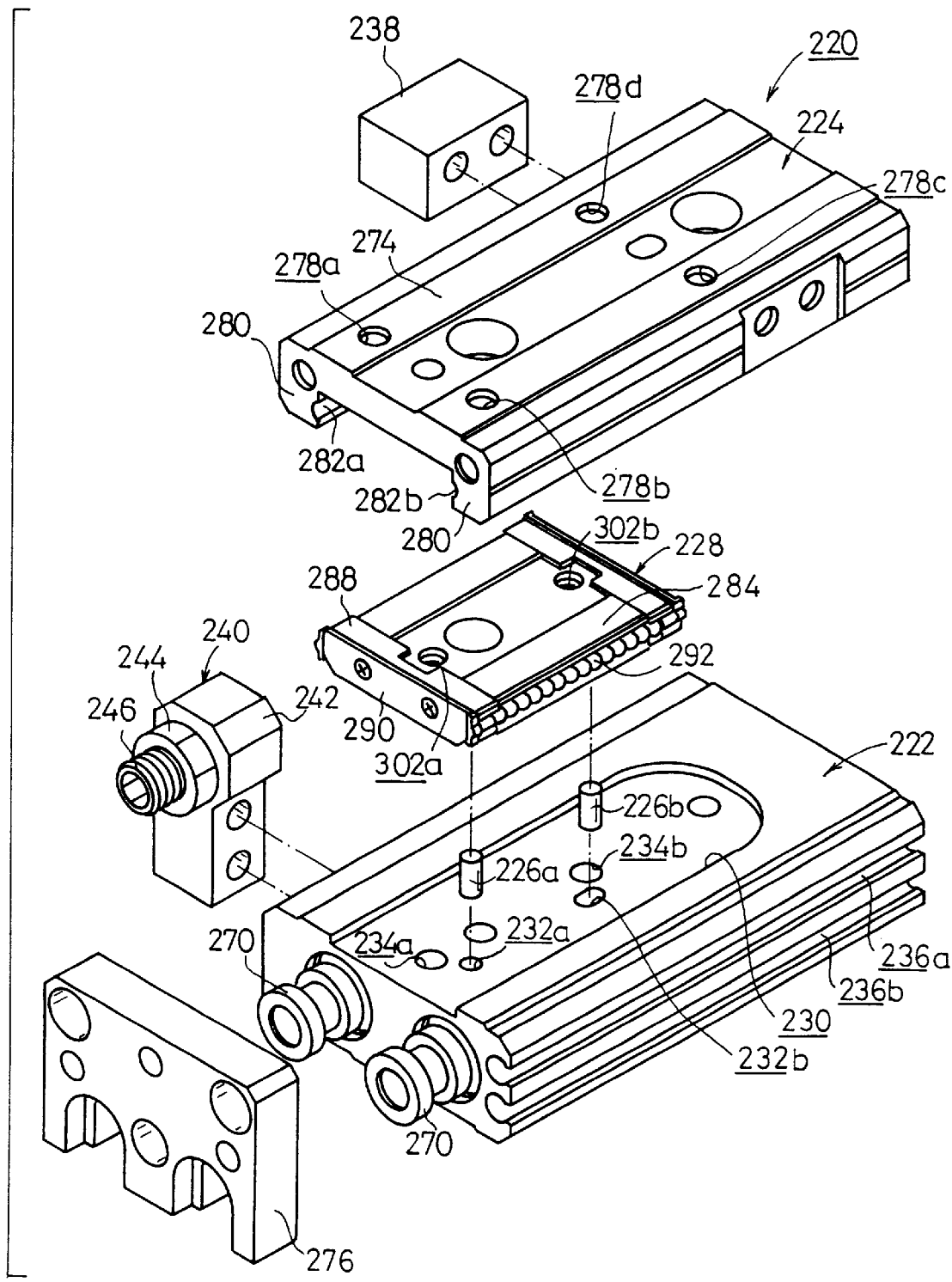
FIG. 19 shows an exploded perspective view illustrating the linear actuator shown in FIG. 18.

The linear actuator 220 comprises a main cylinder body 222, a slide table 224 which is linearly reciprocatable along the longitudinal direction of the main cylinder body 222, and a guide mechanism 228 interposed between the main cylinder body 222 and the slide table 224 and held on the main cylinder body 222 by the aid of a pair of pin members (holding member) 226a, 226b (see FIG. 19).

Figure 20:
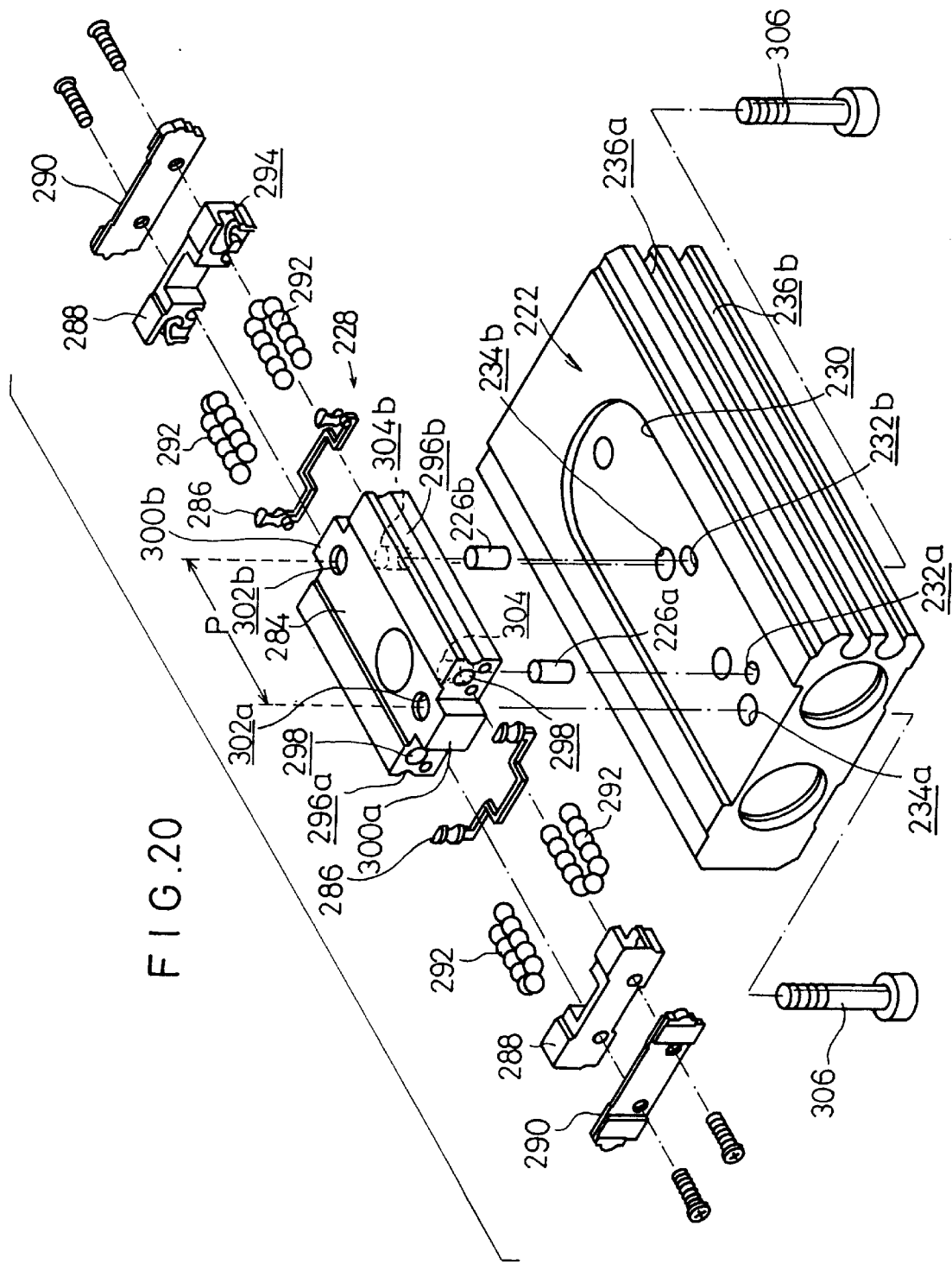
FIG. 20 shows an exploded perspective view illustrating a guide mechanism for constructing the linear actuator shown in FIG. 18.

As shown in FIGS. 19 and 20, a recess 230, which is laterally long from side to side with one end having a curved configuration, is formed along an upper surface of the main cylinder body 222. A pair of pin-inserting holes 232a, 232b for inserting the pin members 226a, 226b thereinto are formed in the recess 230 and separated from each other by a predetermined spacing distance. A pair of attachment holes 234a, 234b for attaching the guide mechanism 228 to the main cylinder body 222 are formed to penetrate through the main cylinder body 222 at positions adjacent to the pin-inserting holes 232a, 232b.

Two stripes of elongated grooves 236a, 236b for attaching sensors are formed in the longitudinal direction along one side surface of the main cylinder body 222. A displacement amount-adjusting member 240 is fastened by screws to the other side surface of the main cylinder body 222. A stopper block 238 described later on is allowed to abut against the displacement amount-adjusting member 240 for regulating the displacement amount of the slide table 224. Unillustrated sensors are fastened at predetermined positions in the sensor-attaching elongated grooves 236a, 236b.

Figure 21:
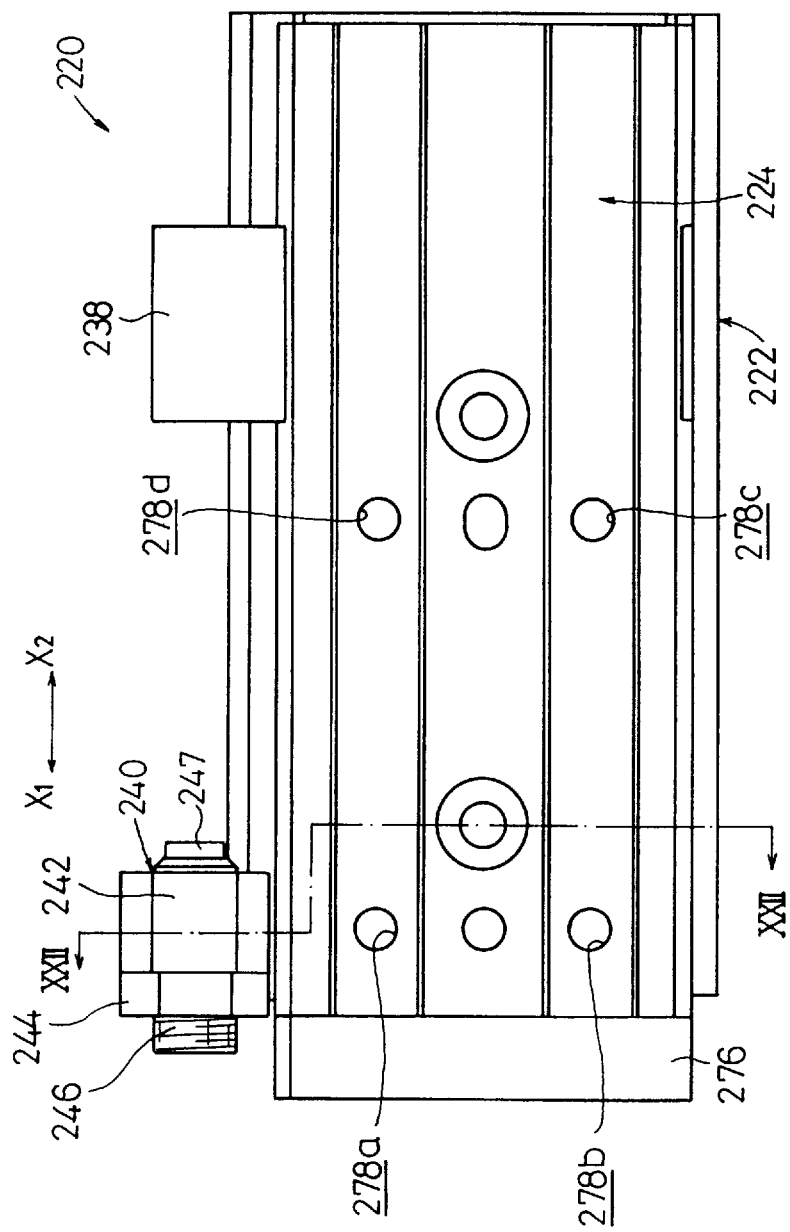
FIG. 21 shows a plan view illustrating the linear actuator shown in FIG. 18.

As shown in FIG. 21, the displacement amount-adjusting member 240 comprises a block member 242, a screw member 246 to be screwed into a hole of the block member 242 and secured to the block member 242 by the aid of a nut 244, and a damper member 247 appended to one end of the screw member 246. The displacement amount of the slide table 224 can be adjusted by increasing or decreasing the screwing amount of the screw member 246 with respect to the block member 242.

A pair of through holes 243a, 243b (see FIG. 22), which are juxtaposed substantially in parallel to one another in the axial direction, are formed inside the main cylinder body 222. Cylinder mechanisms are provided in the through holes 243a, 243b respectively (see FIG. 23). The respective cylinder mechanisms are formed to have a substantially identical configuration, each of which comprises a piston 248 involving a seal ring 245 a magnetic member 247 installed on its outer circumferential surface, and a piston rod 250 connected to the piston 248.

One end of each of the through holes 243a, 243b is closed in an air-tight manner by means of an end cap 254 installed together with a retaining ring 252. The other end of each of the through holes 243a, 243b is closed in an airtight manner by means of a ring member 256, a rod packing 258, and a collar 260 held by the aid of a retaining ring 252. An O-ring 262 is fitted to an annular groove formed along an outer circumferential surface of the collar 260.

In this embodiment, first and second cylinder chambers 264a, 264b are formed in juxtaposition with each other, by the end caps 254 and the collars 260 for closing the pair of through holes 243a, 243b respectively. The first and second cylinder chambers 264a, 264b are formed so that they communicate with each other through communication passages 266a, 266b respectively. A pair of fluid inlet/outlet ports 268a, 268b are formed through one side surface of the main cylinder body 222. The fluid inlet/outlet ports 268a, 268b are formed so that they communicate with the second cylinder chamber 264b. Floating bushes 270 are connected to front ends of the piston rods 250 through screw members.

Figure 18:
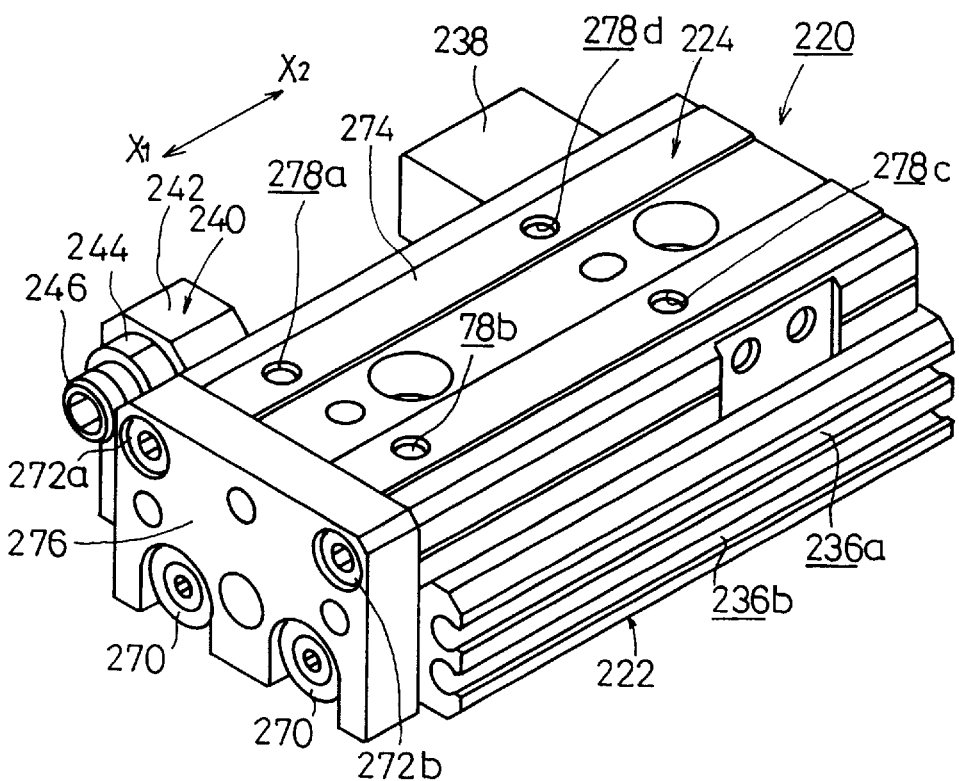
FIG. 18 shows a perspective view illustrating a linear actuator according to a fifth embodiment of the present invention.

As shown in FIG. 18, the slide table 224 comprises a main table body 274 and an end plate 276 which are fastened to one another by screws perpendicularly to give a substantially L-shaped cross section by the aid of a pair of bolts 272a, 272b. The floating bushes 270 are held by semicircular holes formed in the end plate 276.

An unillustrated buffer member is appended to the end plate 276. The buffer member functions to relieve the shock which occurs when the end plate 276 abuts against an end surface of the main cylinder body 222 at one terminal position of a displacement region of the slide table 224. Four workpiece-holding holes 278a to 278d are formed in the main table body 274.

As shown in FIG. 19, the main table body 274 is formed with a pair of guide sections 280 which protrude integrally along the longitudinal direction. Ball-rolling grooves 282a, 282b are formed in the longitudinal direction along opposing inner wall surfaces of the guide sections 280. The stopper block 238 is fastened by screws to one side surface of the main table body 274. The stopper block 238 is displaced integrally with the slide table 224. The displacement amount of the slide table 224 is regulated by the damper member 247 which is allowed to abut against the stopper block 238.

As shown in FIG. 20, the guide mechanism 228 for guiding the slide table 224 comprises a flat guide block 284 which is wide in a direction substantially perpendicular to the axis, pairs of ball-return members 286, cover members 288, and scrapers 290 which are installed to both ends located in the longitudinal direction of the guide block 284 respectively, and the pair of pin members 226a, 226b for positioning and holding the guide block 284 on the main cylinder body 222. Each of the cover members 288 is formed with semicircular ball-return grooves 294 for circulating bearing balls 292 which roll in accordance with a cooperating action with the ball-return member 286.

Ball-rolling grooves 296a, 296b are formed in the longitudinal direction along both side surfaces of the guide block 284. A pair of ball-circulating holes 298, which penetrate through the guide block 284 in the longitudinal direction, are formed at positions adjacent to the ball-rolling grooves 296a, 296b, the ball-circulating holes 298 being separated from each other by a predetermined spacing distance. Continuous ball-circulating passages are formed by the ball-rolling grooves 282a, 282b of the guide sections 280, the ball-rolling grooves 296a, 296b of the guide block 284, the ball-circulating holes 298, and the ball-return grooves 294 of the cover member 288. The plurality of bearing balls 292 roll along the ball-circulating passages. Thus the slide table 224 can be smoothly reciprocated.

Rectangular protrusions 300a, 300b are formed integrally at both ends located in the longitudinal direction of the guide block 284. The formation of the protrusions 300a, 300b makes it possible to increase the distance P between a pair of attachment holes 302a, 302b separated from each other by a predetermined spacing distance.

The guide block 284 is formed, at its bottom surface, with pin-inserting holes 304a, 304b for inserting the pair of pin members 226a, 226b thereinto, the pin-inserting holes 304a, 304b being separated from each other by a predetermined spacing distance. The pair of attachment holes 302a, 302b, which have engraved screw threads and penetrate through the guide block 284, are formed at positions adjacent to the pin-inserting holes 304a, 304b. As described later on, the guide mechanism 228 including the guide block 284 is attached to the upper surface of the main cylinder body 222 by the aid of bolt members 306 which are engaged with the screw threads of the attachment holes 302a, 302b.

The linear actuator 220 according to the fifth embodiment is basically constructed as described above. Next, its operation, function, and effect will be explained.

A pressurized fluid is introduced into one fluid inlet/outlet port 268b from an unillustrated fluid pressure supply source. In this state, the other fluid inlet/outlet port 268a is open to the atmospheric air by operating an unillustrated directional control valve.

Figure 23:
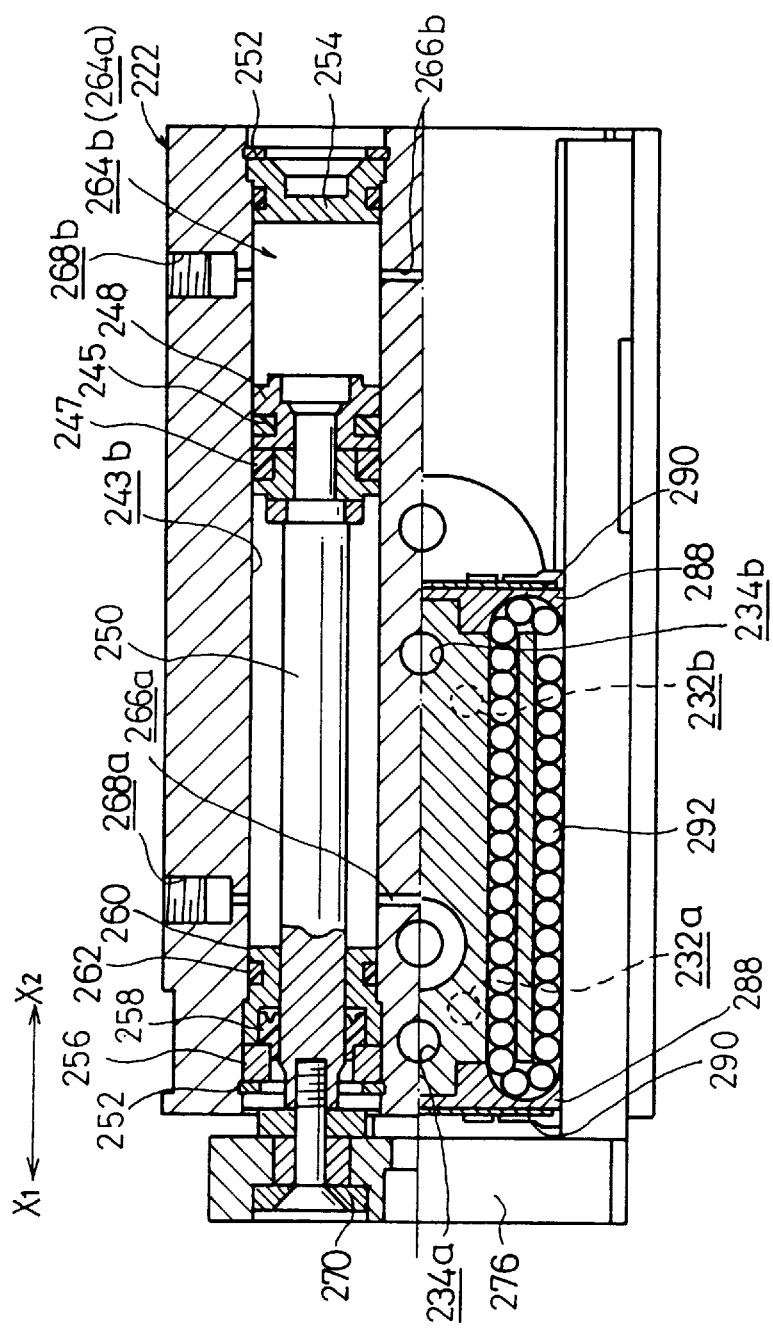
FIG. 23 shows a lateral cross-sectional view taken along a line XXIII—XXIII in FIG. 22.

The pressurized fluid is successively supplied to the second cylinder chamber 264b and the first cylinder chamber 264a communicating with the fluid inlet/outlet port 268b, and it presses the pistons 248 in a direction of an arrow $X_1$ (see FIG. 23). The floating bushes 270, which are engaged with the piston rods 250, are displaced in the direction of the arrow $X_1$ in accordance with the pressing action of the pistons 248. The slide table 224 is displaced integrally with the end plate 276 in accordance with the rolling action of the bearing balls 292.

The stopper block 238 is displaced together with the slide table 224 during the process of displacement of the slide table 224 toward the direction of the arrow $X_1$. When the stopper block 238 abuts against the damper member 247 installed on the screw member 246, it arrives at the terminal position of the displacement. In this embodiment, the displacement amount of the slide table 224 can be changed increasingly or decreasingly by loosening the nut 244 and adjusting the screwing amount of the screw member 246 with respect to the block member 242.

When the slide table 224 is displaced in a direction opposite to the direction described above, the pressurized fluid is supplied to the fluid inlet/outlet port 268a. The supplied pressurized fluid is successively introduced into the second cylinder chamber 264b and the first cylinder chamber 264a, and it presses the pistons 248 toward the direction indicated by an arrow $X_2$. The end plate 276 and the slide table 224 are displaced integrally in the direction indicated by the arrow $X_2$ by the aid of the floating bushes 270 engaged with the piston rods 250 in accordance with the pressing action of the pistons 248. When the unillustrated buffer member provided on the end plate 276 abuts against the end surface of the main cylinder body 222, the slide table 224 returns to its initial position illustrated in FIG. 18.

Next, explanation will be made for a step of assembling the guide mechanism 228 to the main cylinder body 222.

The pin members 226a, 226b are inserted into the pair of pin-inserting holes 304a, 304b which are bored in the bottom surface of the guide block 284 and separated from each other by the predetermined spacing distance, and into the pair of pin-inserting holes 232a, 232b which are bored in the upper surface of the main cylinder body 222 respectively. Thus the guide mechanism 228 including the guide block 284 is positioned and secured to the recess 230 of the main cylinder body 222. The bolt members 306 are inserted into the pair of attachment holes 234a, 234b which are formed to penetrate through the main cylinder body 222. Each of the bolt members 306 is engraved with a screw at its one end which is screwed into the screw thread of each of the attachment holes 302a, 302b of the guide block 284. Thus the guide mechanism 228 is fastened by screws to the main cylinder body 222.

As described above, the guide block 284 for constructing the guide mechanism 228 is secured to the main cylinder body 222 in accordance with the cooperating action of the bolt members 306 which are screwed into the attachment holes 302a, 302b formed to have the large separating distance (pitch P), and the pin members 226a, 226b which are inserted into the pin-inserting holes 304a, 304b.

Figure 22:
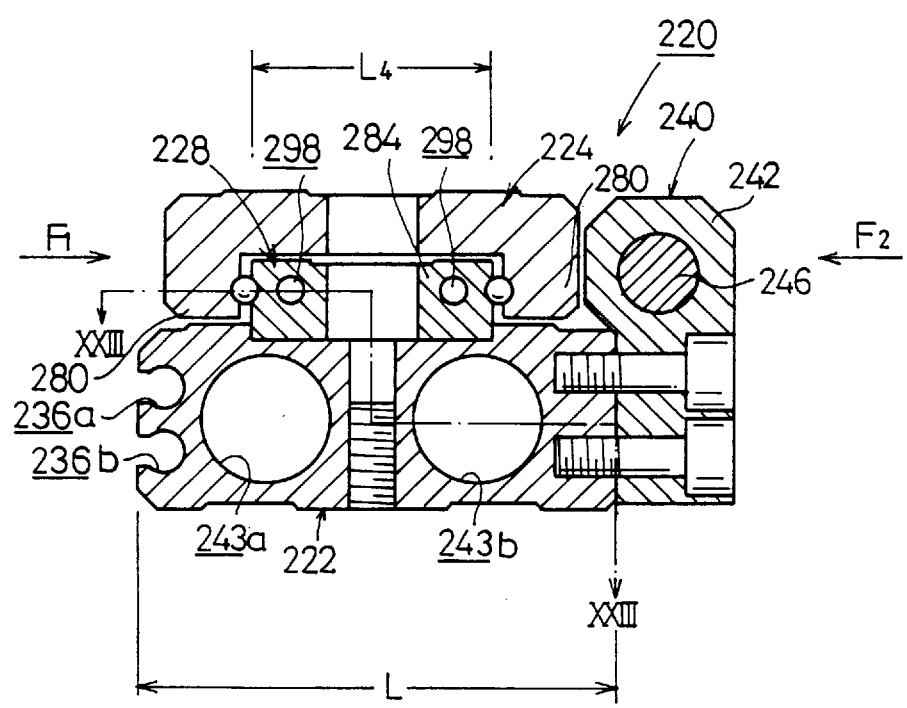
FIG. 22 shows a vertical cross-sectional view taken along a line XXII—XXII in FIG. 21.
Figure 39A:
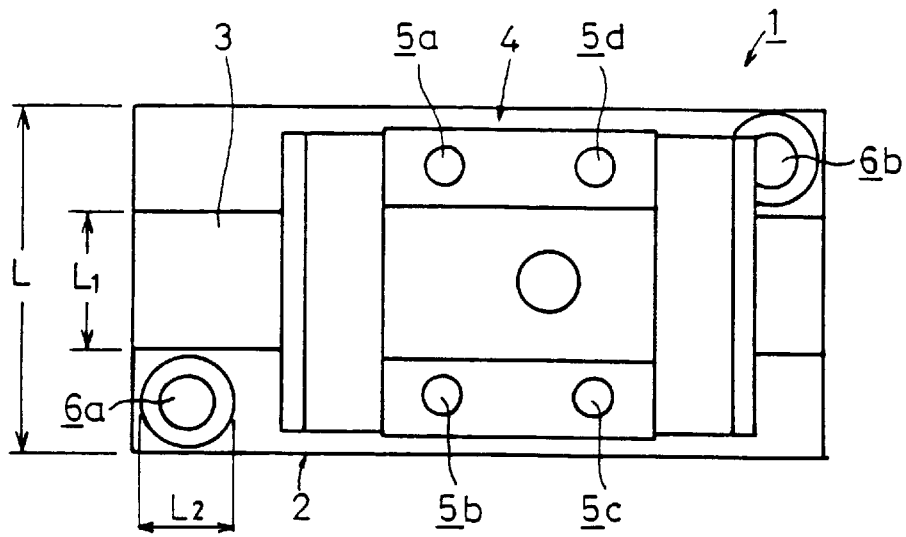
FIG. 39A shows a plan view illustrating a linear actuator concerning a conventional technique.
Figure 39B:
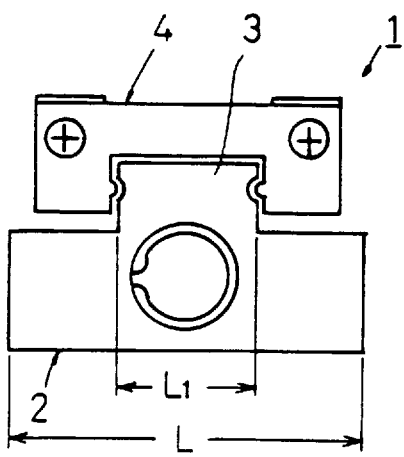
FIG. 39B shows a side view thereof.
Figure 40:
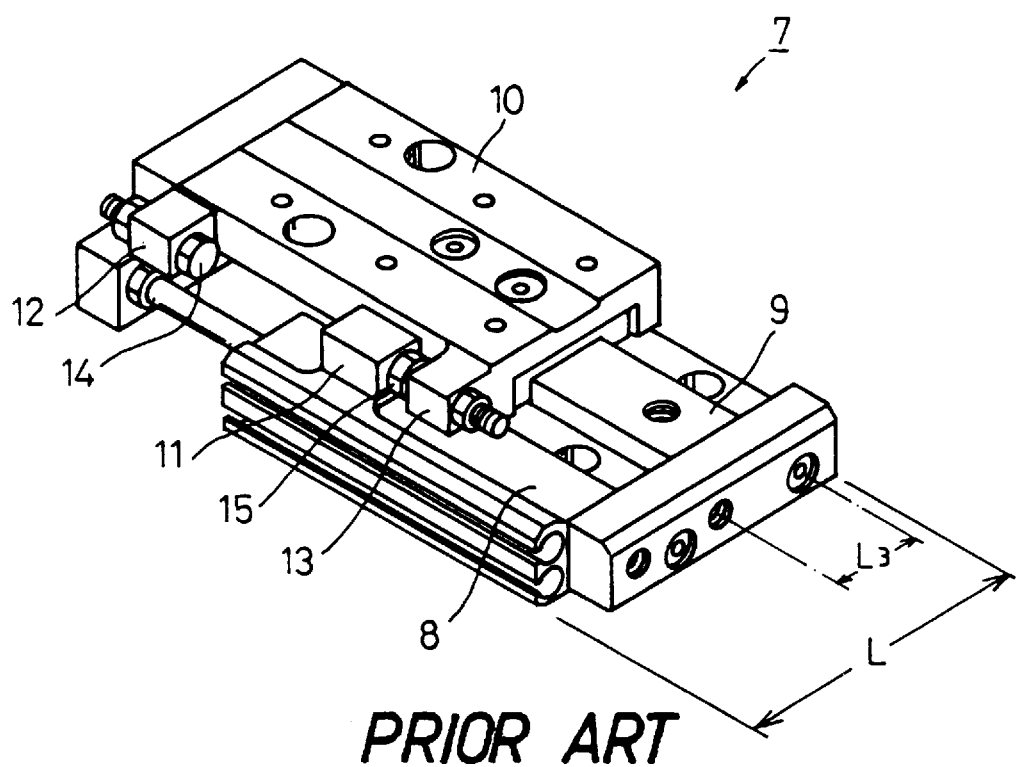
FIG. 40 shows a perspective view illustrating a linear actuator concerning another conventional technique.
Figure 41:
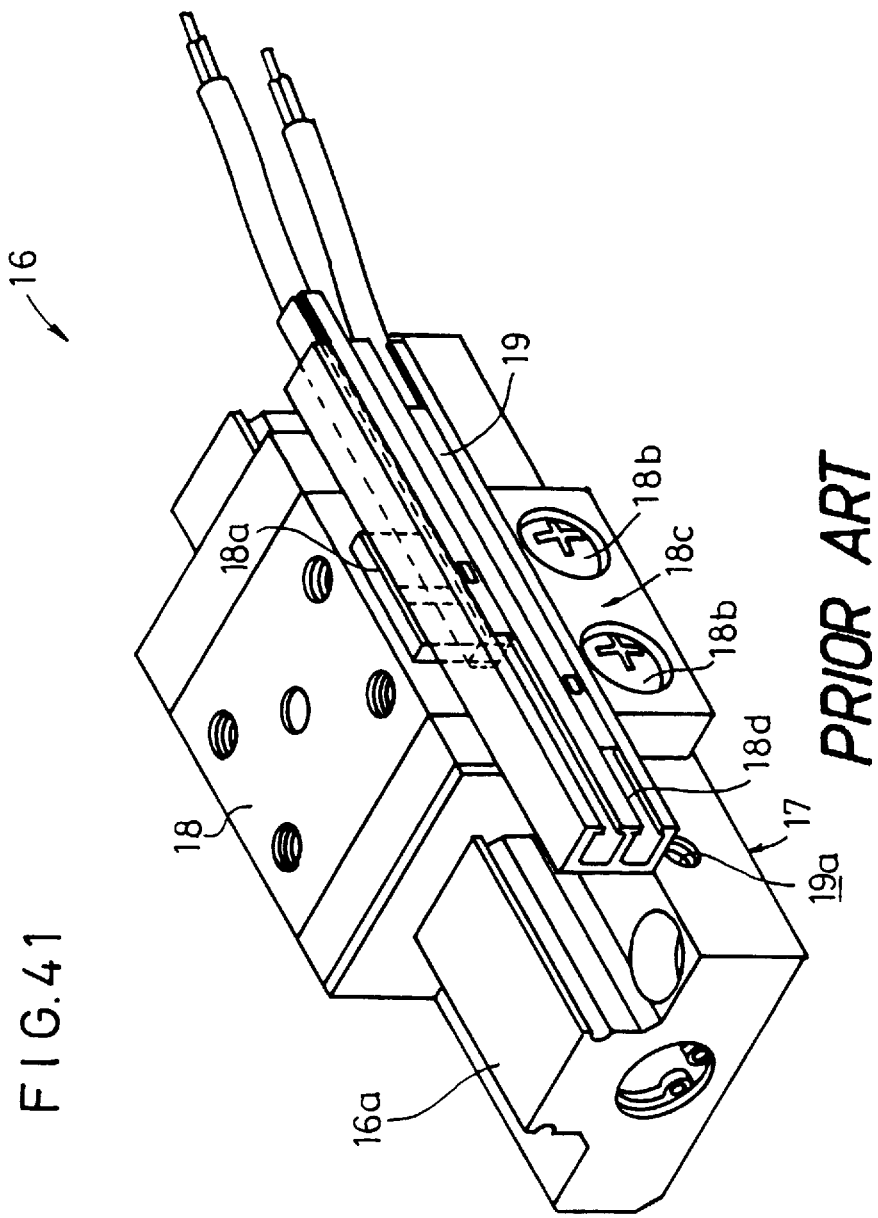
FIG. 41 shows a perspective view illustrating a linear actuator concerning another conventional technique.
Figure 42:
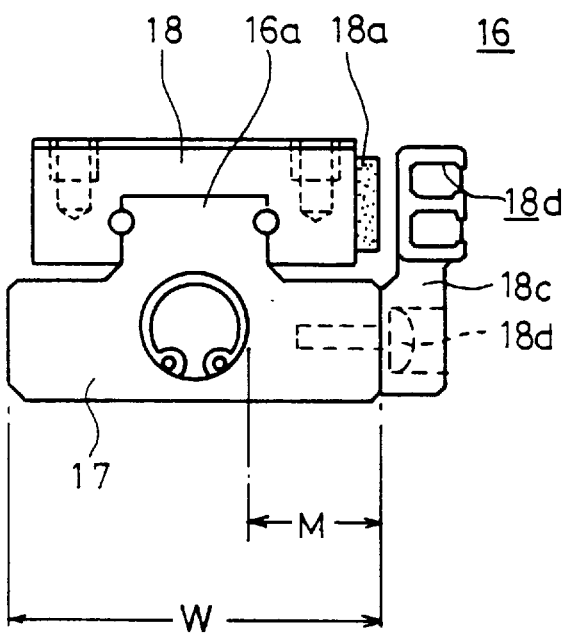
FIG. 42 shows a side view illustrating a linear actuator concerning another conventional technique.

As shown in FIG. 22, the linear actuator 220 according to this embodiment includes the guide mechanism 228 which is formed to be wide as compared with the guide rail 3 and the linear guide 9 concerning the conventional techniques shown in FIGS. 39A, 39B, and 40, by increasing the ratio of the width $L_4$ of the guide mechanism 228 to the width L of the main cylinder body 222. The pin members 226a, 226b are interposed between the guide block 284 and the main cylinder body 222 in addition to the bolt members 306 for attaching the guide mechanism 228 to the main cylinder body 222.

Therefore, the slide table 224 is supported in a stable manner even if loads $F_1$, $F_2$ are applied substantially horizontally to the slide table 224 (see FIG. 22). Accordingly, the slide table 224 can be smoothly reciprocated while maintaining linear accuracy of the slide table 224. As a result, a workpiece can be transported in a stable manner by the aid of the slide table 224.

Next, a linear actuator 320 according to a sixth embodiment of the present invention is shown in FIGS. 24 to 31. The linear actuator 320 comprises a main cylinder body 322, a slide table 324 which is linearly reciprocatable along the longitudinal direction of the main cylinder body 322, a sensor-attaching rail (block member) 326 fastened by screws to one side surface of the main cylinder body 322, and a plate (closing plate) 327 fastened by screws to the other side surface of the main cylinder body 322 and opposing to the sensor-attaching rail 326.

Figure 24:
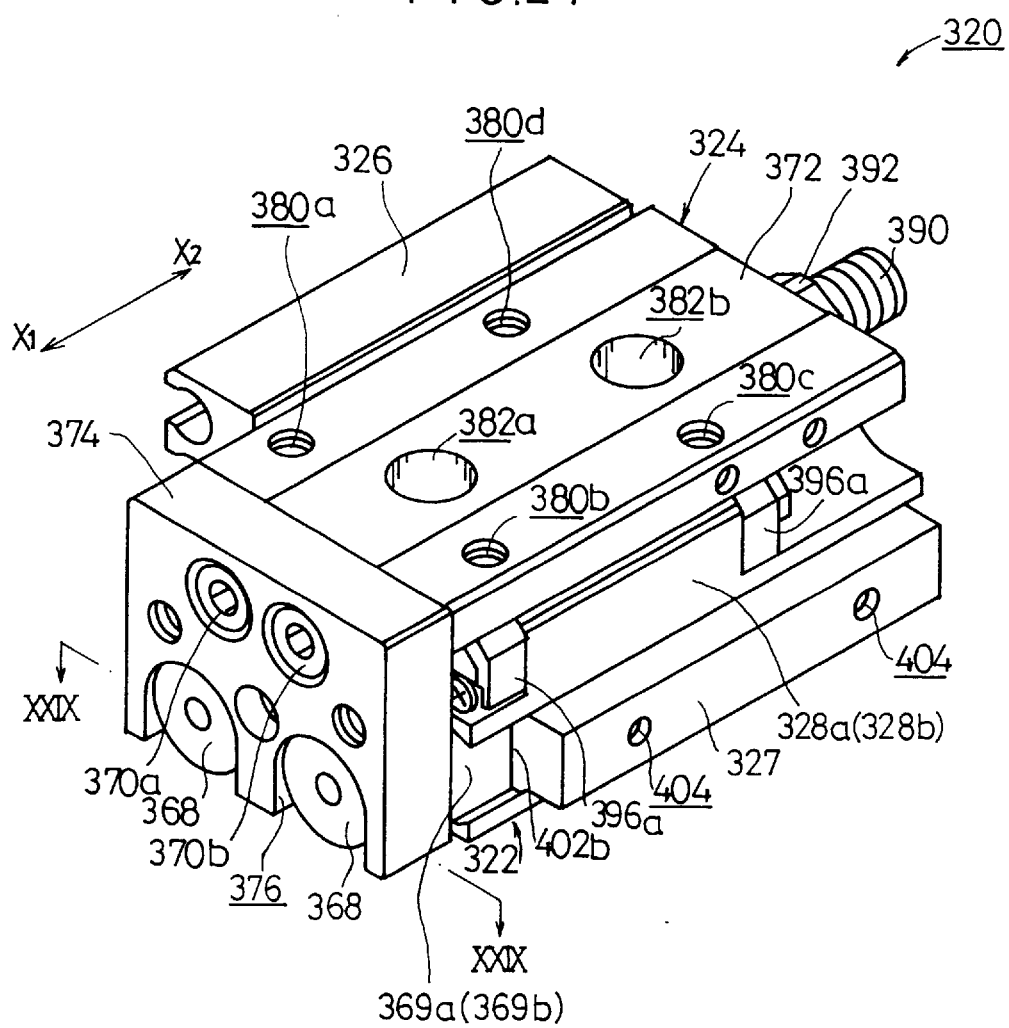
FIG. 24 shows a perspective view illustrating a linear actuator according to a sixth embodiment of the present invention.
Figure 31:
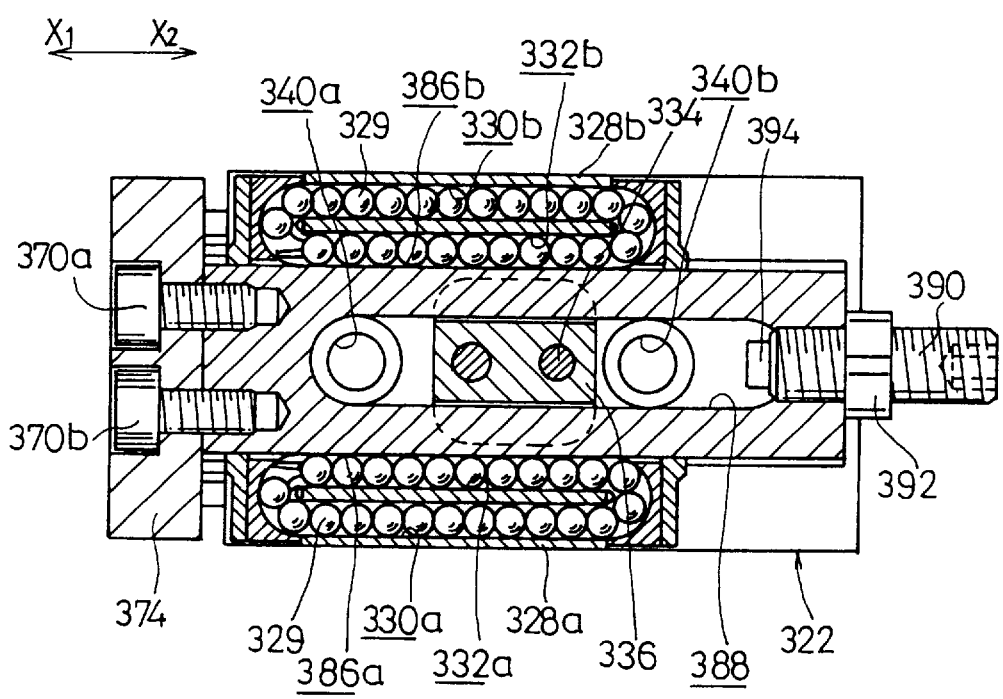
FIG. 31 shows a lateral cross-sectional view taken along a line XXXI—XXXI in FIG. 30.
Figure 32:
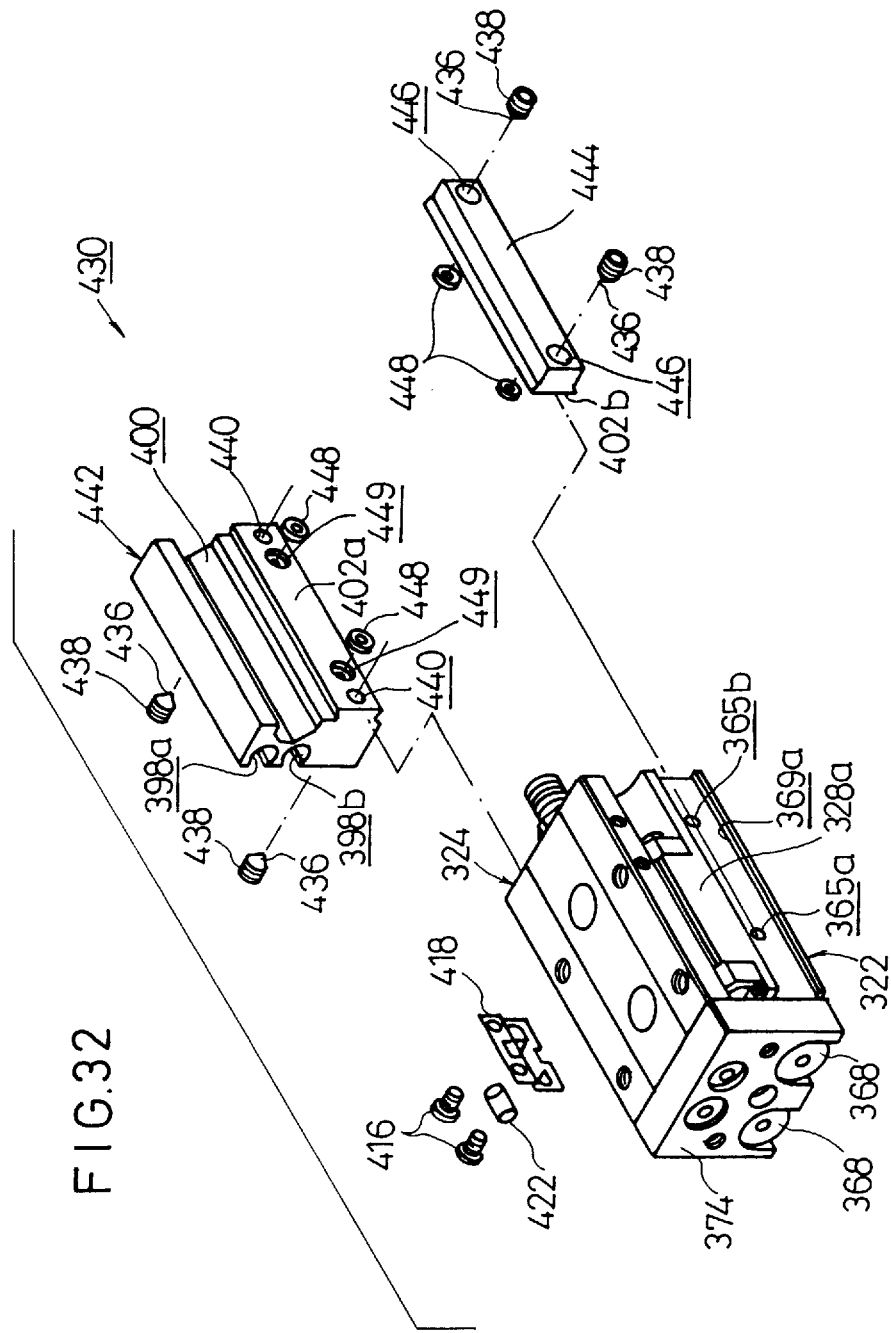
FIG. 32 shows an exploded perspective view illustrating a linear actuator according to a seventh embodiment of the present invention.
Figure 33:
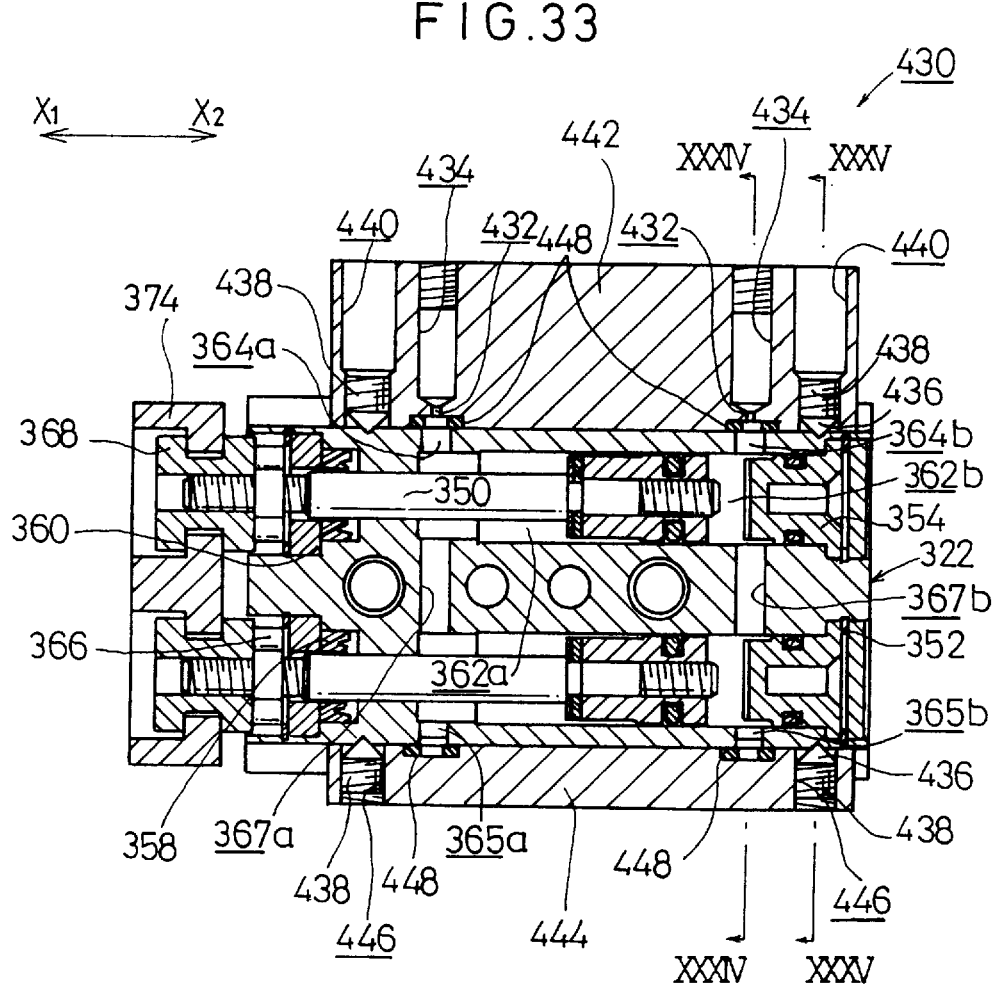
FIG. 33 shows a lateral cross-sectional view illustrating the linear actuator shown in FIG. 32.
Figure 34:
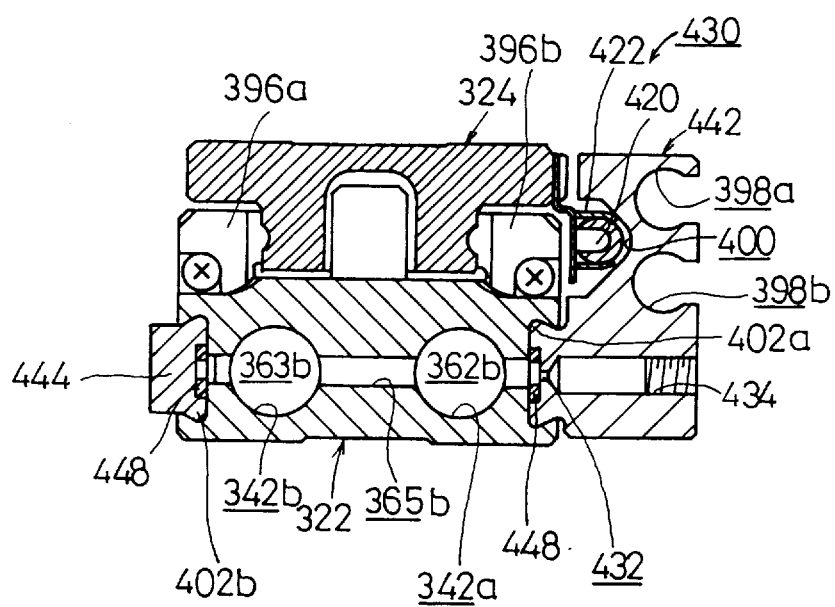
FIG. 34 shows a vertical cross-sectional view taken along a line XXXIV—XXXIV in FIG. 33.
Figure 35:
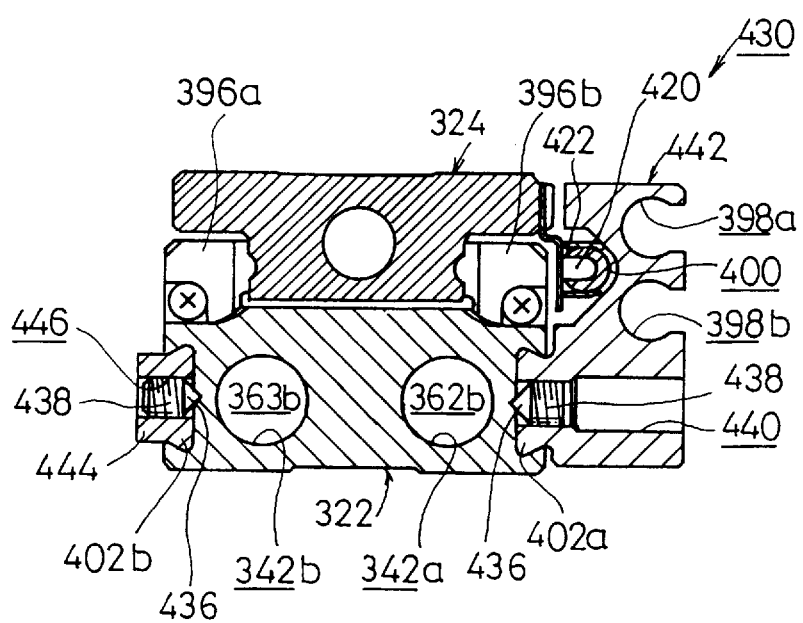
FIG. 35 shows a vertical cross-sectional view taken along a line XXXV—XXXV in FIG. 33.

As shown in FIGS. 24 and 31, a pair of mutually opposing guide blocks 328a, 328b are formed integrally with the main cylinder body 322 to protrude on an upper surface of the main cylinder body 322. Ball-circulating holes 330a, 330b and ball-rolling grooves 332a, 332b, which constitute endless circulating tracks for rolling a plurality of bearing balls 329, are formed in the pair of guide blocks 328a, 328b along the longitudinal direction respectively.

Figure 28:
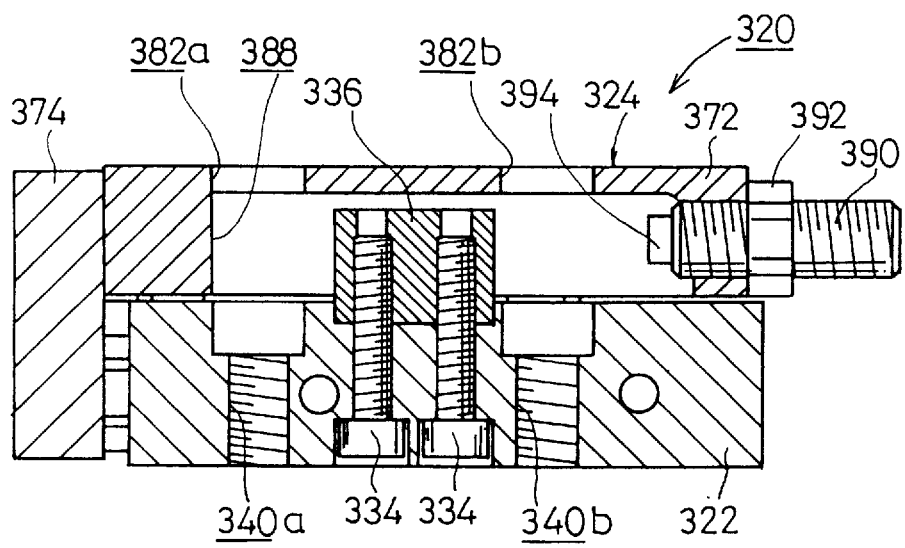
FIG. 28 shows a vertical cross-sectional view taken along a line XXVIII—XXVIII in FIG. 26.

As shown in FIG. 28, a rectangular parallelepiped-shaped stopper block 336 is fixed by a pair of screws 334 at a substantially central portion between the pair of guide blocks 328a, 328b. A pair of attachment holes 340a, 340b, which penetrate through the main cylinder body 322 in a direction substantially perpendicular to the axis, are formed at positions closely near to the stopper blocks 336.

Figure 29:
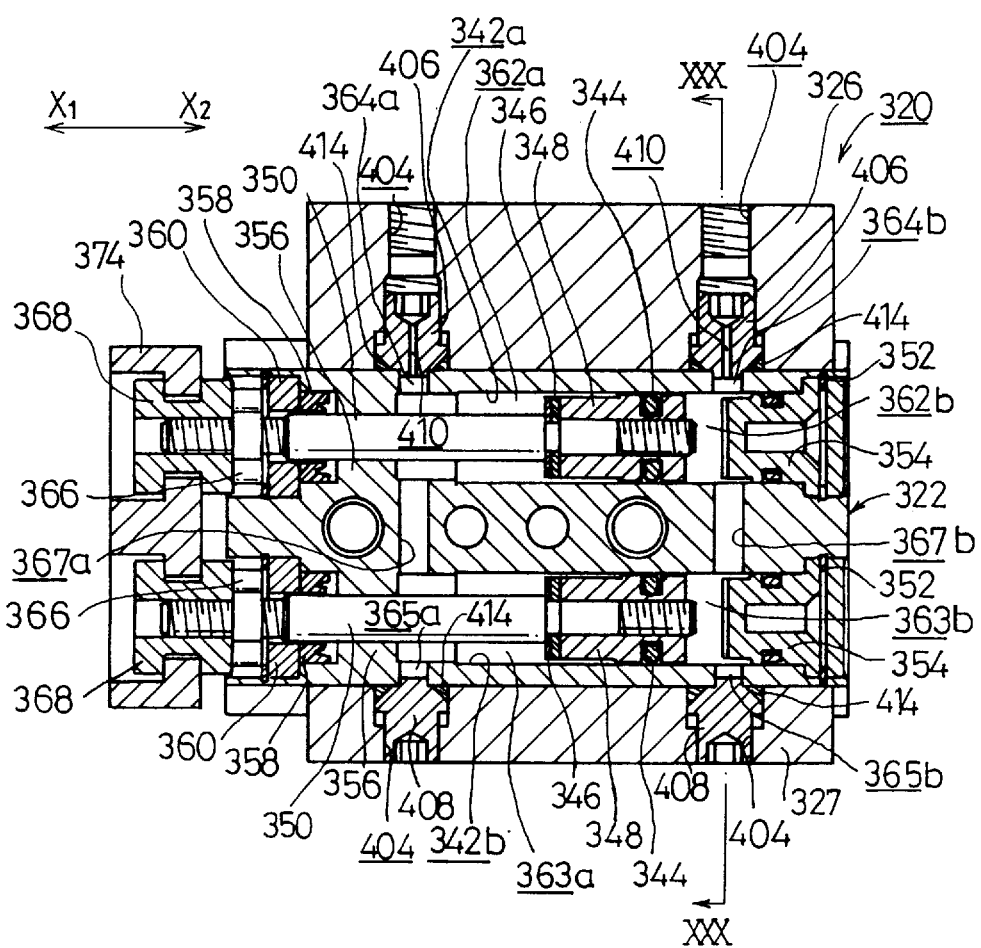
FIG. 29 shows a lateral cross-sectional view taken along a line XXIX—XXIX in FIG. 24.

As shown in FIG. 29, a pair of through holes 342a, 342b, which are juxtaposed substantially in parallel to one another in the axial direction, are formed in the main cylinder body 322. The through holes 342a, 342b accommodate pistons 348 each of which is formed to have a substantially identical shape and installed with a seal ring 344 and a damper 346 on its outer circumferential surface, and piston rods 350 connected to the pistons 348 respectively.

Each of the through holes 342a, 342b is closed at its one end in an air-tight manner by means of an end cap 354 installed together with a retaining ring 352. The other end of each of the through holes 342a, 342b is closed by an annular bulge 356 which slidably contacts with the outer circumferential surface of the piston rod 350. The piston rod 350, which is exposed to the outside through the annular bulge 356, is sealed by a rod packing 358 and a collar 360 held by the main cylinder body 322 by the aid of a retaining ring.

In this embodiment, first cylinder chambers 362a, 362b and second cylinder chambers 363a, 363b are substantially formed by the end caps 354 and the annular bulges 356 for closing the pair of through holes 342a, 342b respectively. The first cylinder chambers 362a, 362b and the second cylinder chambers 363a, 363b are formed to communicate with each other through communication passages 367a, 367b.

Pairs of first fluid inlet/outlet ports 364a, 364b and second fluid inlet/outlet ports 365a, 365b are arranged axially symmetrically in relation to the axis of the main cylinder body 322 as an axis of symmetry, on mutually opposing both side surfaces of the main cylinder body 322 respectively. The first fluid inlet/outlet ports 364a, 364b are formed to communicate with the first cylinder chambers 362a, 362b respectively. The second fluid inlet/outlet ports 365a, 365b are formed to communicate with the second cylinder chambers 363a, 363b respectively. Floating bushes 368 are connected to front ends of the piston rods 350 by the aid of lock nuts 366.

Figure 30:
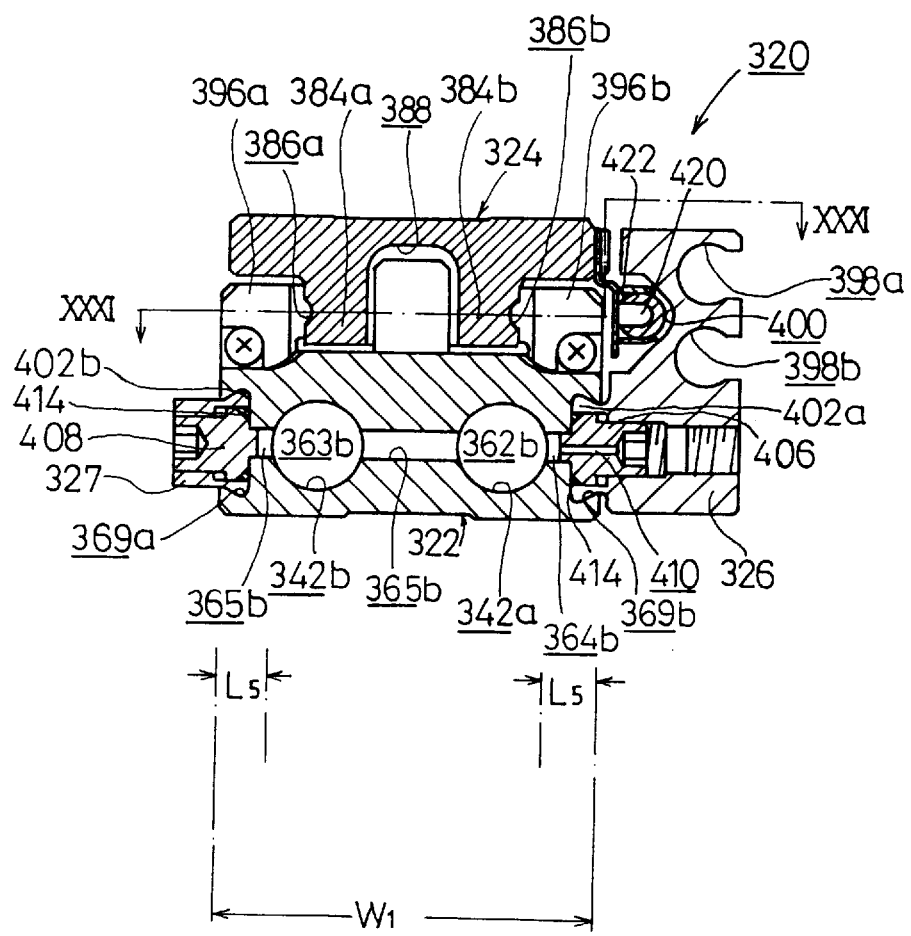
FIG. 30 shows a vertical cross-sectional view taken along a line XXX—XXX in FIG. 29.

As shown in FIG. 30, a pair of grooves 369a, 369b for installing the sensor-attaching rail 326 and the plate 327 to the main cylinder body 322 are formed along the opposing both side surfaces of the main cylinder body 322. The pair of grooves 369a, 369b are formed axially symmetrically respectively.

As shown in FIG. 24, the slide table 324 comprises a table 372 and an end plate 374 which are fastened by screws substantially perpendicularly to have a substantial L-shaped cross section by the aid of a pair of bolts 370a, 370b. The floating bushes 368 are held by semicircular holes 376 formed in the end plate 374. An unillustrated buffer member is inserted into a hole formed in the end plate 374. The buffer member functions to relieve the shock generated when the end plate 374 abuts against the end surface of the main cylinder body 322 at one terminal position of displacement of the slide table 324.

Figure 26:
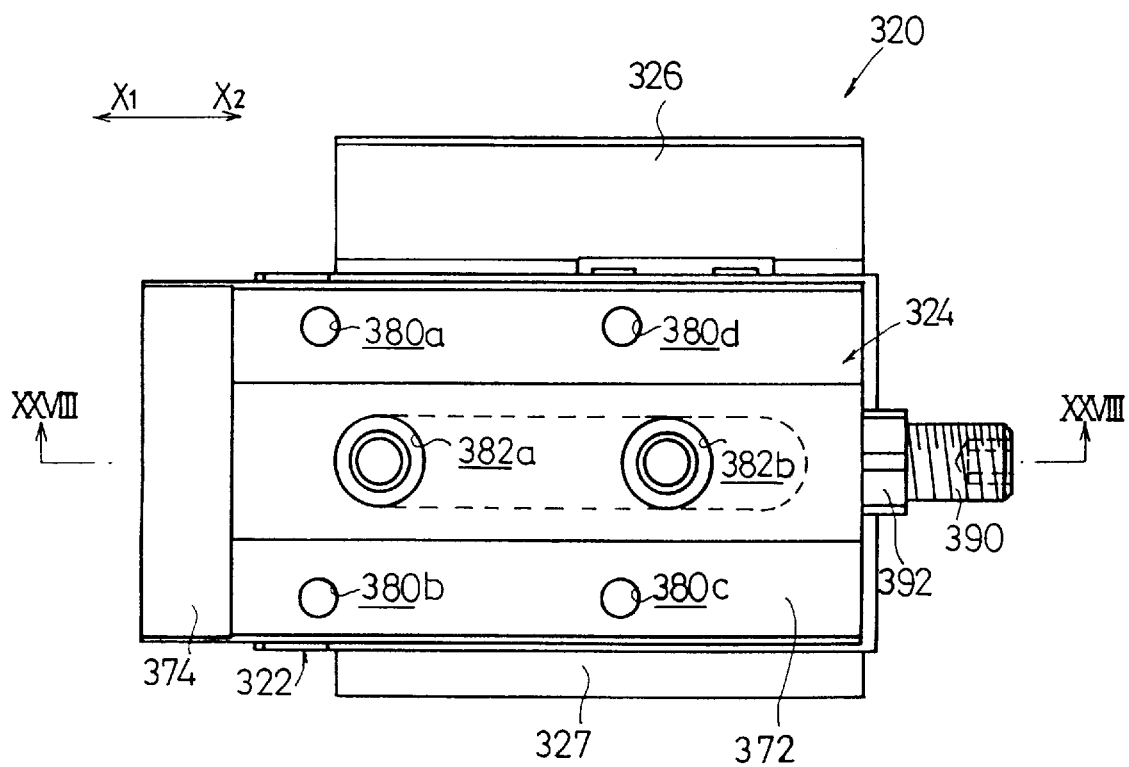
FIG. 26 shows a plan view illustrating the linear actuator shown in FIG. 24.

The table 372 is formed with four workpiece-holding holes 380a to 380d and a pair of through holes 382a, 382b corresponding to and communicating with the attachment holes 340a, 340b of the main cylinder body 322 (see FIGS. 24 and 26). In this embodiment, the main cylinder body 322 may be attached to another member by screwing unillustrated bolts into the attachment holes 340a, 340b from an upper surface side of the table 372 through the through holes 382a, 382b. Alternatively, the main cylinder body 322 may be attached by directly screwing the bolts into the attachment holes 340a, 340b from a bottom surface side of the main cylinder body 322 (see FIG. 28). As described above, an operator can select any of attachment directions of the linear actuator 320 from upward and downward directions.

As shown in FIG. 30, a pair of guide sections 384a, 384b, which extend along the longitudinal direction, are integrally formed to protrude on the lower surface of the slide table 324. Ball-rolling grooves 386a, 386b are formed along the longitudinal direction on opposing side surfaces of the guide sections 384a, 384b. A cutout 388, which extends over a predetermined length along the axial direction corresponding to the shape of the stopper block 336, is formed between the pair of guide sections 384a, 384b separated from each other by a predetermined spacing distance (see FIGS. 28 and 30).

As shown in FIG. 28, an adjuster bolt 390, which functions as a displacement amount-adjusting member for the slide table 324, is screwed at one end of the cutout 388 by the aid of a lock nut 392. A buffer member 394, which is composed of, for example, rubber such as urethane, is installed to a front end of the adjuster bolt 390.

In this embodiment, the adjuster bolt 390 is displaced integrally with the slide table 324. The displacement amount of the slide table 324 is regulated by abutment of the buffer member 394 against the stopper block 336. The adjuster bolt 390 and the buffer member 394 are provided approximately at the central portion of one end of the slide table 324 along the axial direction (see FIGS. 26 and 28). Accordingly, the adjuster bolt 390 and the buffer member 394 function to decrease any biased load applied to the slide table 324 when the slide table 324 arrives at its terminal position of displacement. As a result, an unillustrated workpiece, which is placed on the slide table 324, can be prevented from transmission of any biased load.

The guide mechanism for guiding the slide table 324 along the axial direction of the main cylinder body 322 comprises the guide sections 384a, 384b which are integrally formed to protrude on the lower surface of the slide table 324 and formed with the pair of ball-rolling grooves 386a, 386b mutually opposing on the both side surfaces, and the pair of guide blocks 328a, 328b which are separated by a predetermined distance on the both sides of the guide sections 384a, 384b, formed integrally to protrude on the upper surface of the main cylinder body 322, and formed with the ball-circulating holes 330a, 330b and the ball-rolling grooves 332a, 332b respectively. Covers 396a, 396b and unillustrated scrapers are fastened by screws to both ends of the guide blocks 328a, 328b respectively.

Figure 25:
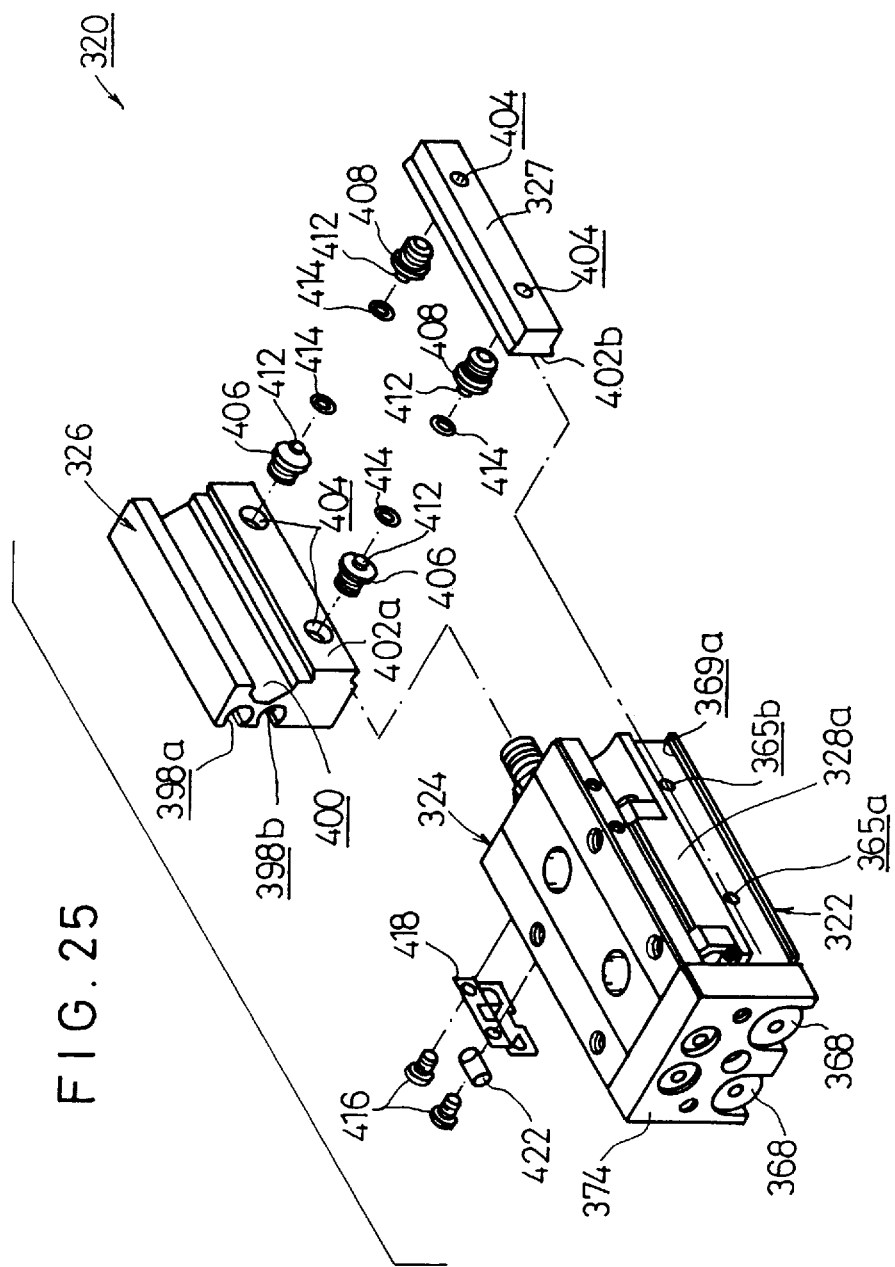
FIG. 25 shows an exploded perspective view illustrating the linear actuator shown in FIG. 24.

As shown in FIG. 25, the sensor-attaching rail 326 and the plate 327 are detachably provided in a mutually opposing manner on the both side surfaces of the main cylinder body 322. Two stripes of elongated grooves 398a, 398b, which are substantially parallel to one another along the longitudinal direction, are formed on one side surface of the sensor attaching rail 326. Unillustrated sensors are selectively fastened to predetermined positions in the elongated grooves 398a, 398b. A cutout 400, which is configured to have a <-shaped cross section, is formed along the longitudinal direction on the other side surface of the sensor-attaching rail 326. Provision of the cutout 400 makes it possible to smoothly displace a magnetic member described later on.

Locking sections 402a, 402b, which have stepped sections to be wide in width corresponding to cross-sectional configurations of the grooves 369a, 369b, for holding the sensor-attaching rail 326 and the plate 327 on the main cylinder body 322, are formed along the longitudinal direction on the sensor-attaching rail 326 and the plate 327 respectively.

In this embodiment, the locking sections 402a, 402b are inserted from ends of the grooves 369a, 369b, and the locking sections 402a, 402b are allowed to slide along the grooves 369a, 369b. Thus the sensor-attaching rail 326 and the plate 327 can be conveniently installed to the main cylinder body, or the sensor-attaching rail 326 and the plate 327 can be conveniently detached from the main cylinder body 322. As described above, the sensor-attaching rail 326 and the plate 327 are formed so that they are selectively installed to the respective grooves 369a, 369b, and they are mutually interchangeable.

As shown in FIGS. 25 and 29, the sensor-attaching rail 326 and the plate 327 are formed with a pair of screw holes 404 which penetrate through the sensor-attaching rail 326 and the plate 327 in a direction substantially perpendicular to the longitudinal direction respectively. The screw holes 404 are separated from each other by a predetermined spacing distance, each having an annular stepped section. Set screws (fixing member) 406, 408, which have a substantially tapered front end, are screwed into the respective screw holes 404.

The set screw 406 to be screwed into the sensor-attaching rail 326 has a passage 410 which penetrate through the set screw 406 along its axial direction (see FIG. 29). The passages 410 are formed to communicate with the first fluid inlet/outlet ports 364a, 364b (or the second fluid inlet/outlet ports 365a, 365b) respectively. The set screws 408 to be screwed into the plate 327 function to close the second fluid inlet/outlet ports 365a, 365b (or the first fluid inlet/outlet ports 364a, 364b).

Annular projections 412 are formed at front ends of the set screws 406, 408. The sensor-attaching rail 326 and the plate 327 can be positioned and installed to the side surfaces of the main cylinder body 322 by inserting and fitting the annular projections 412 into the first fluid inlet/outlet ports 364a, 364b or the second fluid inlet/outlet ports 365a, 365b respectively. An O-ring 414 having a triangular cross section is installed to each of the annular projections 412 of the set screws 406, 408 in order to maintain their connecting portions in an air-tight manner. As shown in FIG. 25, the set screws 406, 408 are screwed into the respective screw holes 404 from inner sides of the sensor-attaching rail 326 and the plate 327.

Figure 27:
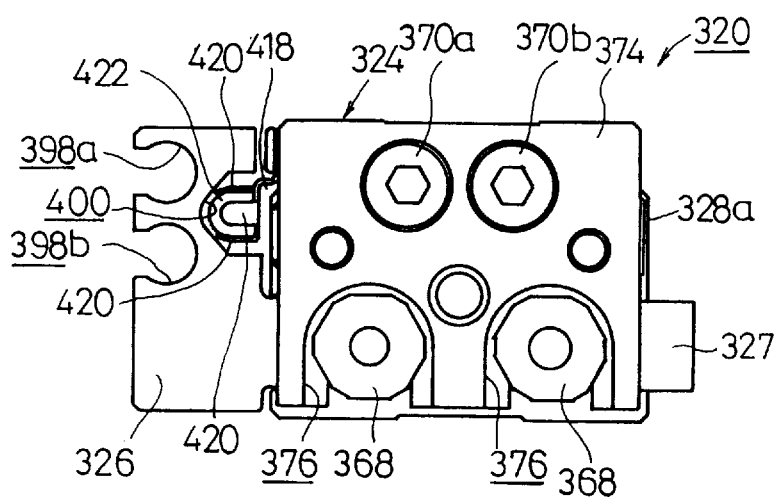
FIG. 27 shows a side view illustrating the linear actuator shown in FIG. 24.

As shown in FIGS. 25 and 27, a metallic fixture 418 is fastened by screws 416 to one side surface of the main cylinder body 322. Parts of the metallic fixture 418, which are located at ends thereof in vertical and lateral four directions, are bent to form pawls 420 with which a cylindrical magnetic member 422 is held. In this embodiment, the magnetic member 422 is arranged to face the cutout 400 having the <-shaped cross section formed along the sensor-attaching rail 326.

The linear actuator 320 according to the sixth embodiment of the present invention is basically constructed as described above. Next, its operation, function, and effect will be explained.

At first, an operator makes selection so that the sensor-attaching rail 326 is installed to one side surface of the main cylinder body 322, and the plate 327 is installed to the other side surface of the main cylinder body 322. In this embodiment, the sensor-attaching rail 326 and the plate 327 can be conveniently installed to the main cylinder body 322 by inserting and fitting them into the pair of grooves 369a, 369b while sliding the locking sections 402a, 402b along the pair of grooves 369a, 369b formed to have the identical shape on the side surfaces of the main cylinder body 322.

When the sensor-attaching rail 326 and the plate 327 are installed to the main cylinder body 322, the pairs of set screws 406, 408 are screwed from the inner sides of the sensor-attaching rail 326 and the plate 327 (see FIG. 25). The annular projections 412 formed at the front ends of the set screws 406, 408 are inserted and fitted into the first fluid inlet/outlet ports 364a, 364b and the second fluid inlet/outlet ports 365a, 365b respectively. Thus the sensor attaching rail 326 and the plate 327 are positioned and held at predetermined positions on the main cylinder body 322 (see FIG. 29).

Subsequently, unillustrated tube fittings are screwed into the screw holes 404 of the sensor-attaching rail 326. During this process, no obstruction projecting outwardly is present at all around the screw holes 404. Therefore, the tube fittings can be installed conveniently as compared with the conventional technique.

After performing the preliminary operation as described above, a pressurized fluid supplied from an unillustrated fluid pressure supply source is introduced into the one first fluid inlet/outlet port 364b through the passage 410 in the set screw 406. In this state, the other fluid inlet/outlet port 364a is open to the atmospheric air by operating an unillustrated directional control valve.

The pressurized fluid is supplied to the one first cylinder chamber 362b communicating with the first fluid inlet/outlet port 364b, and it presses the piston 348 in a direction of an arrow $X_1$ (see FIG. 29). The end plate 374, which is engaged with the piston rod 350, is displaced in the direction of the arrow $X_1$ in accordance with the pressing action of the piston 348. The slide table 324 is displaced integrally with the end plate 374 in accordance with the rolling action of the bearing balls 329.

The buffer member 394, which is installed to the adjuster bolt 390 displaced together with the slide table 324, abuts against the stopper block 336 during the process of displacement of the slide table 324 toward the direction of the arrow $X_1$. Thus the slide table 324 arrives at the terminal position of the displacement. In this embodiment, the displacement amount of the slide table 324 can be changed increasingly or decreasingly by loosening the lock nut 392 and adjusting the screwing amount of the adjuster bolt 390.

When the slide table 324 is displaced in a direction opposite to the direction described above, the pressurized fluid is supplied to the other first fluid inlet/outlet port 364a. The supplied pressurized fluid is introduced into the other first cylinder chamber 362a, and it presses the piston 348 in a direction of an arrow $X_2$. The slide table 324 is displaced in the direction of the arrow $X_2$ by the aid of the end plate 374 engaged with the piston rod 350 in accordance with the pressing action of the piston 348. The slide table 324 arrives at the terminal position of the displacement when the unillustrated buffer member provided on the end plate 374 abuts against the end surface of the main cylinder body 322.

In the case of the linear actuator 320 according to the sixth embodiment of the present invention, the sensor-attaching rail 326 is not fastened by screws to the main cylinder body 322. Instead, the sensor attaching rail 326 can be conveniently installed to the groove 369a (369b) of the main cylinder body 322 by inserting and fitting the locking section 402a of the sensor-attaching rail 326 along the groove 369a (369b). The thickness $L_5$, between the inner wall surface of the first and second cylinder chambers 362b (363b) and the outer wall surface of the main cylinder body 322 (see FIG. 30) can be formed to be thin as compared with the conventional technique.

As described above, in the case of the linear actuator 320 according to the sixth embodiment of the present invention, the thickness $L_5$ between the inner wall surface of the first and second cylinder chambers 362b (363b) and the outer wall surface of the main cylinder body 322 is formed to be thin as compared with the conventional technique. Accordingly, the width $W_1$ of the main cylinder body 322 in the transverse direction can be reduced. As a result, it is possible to allow the entire apparatus to have a compact size and a light weight.

In the case of the linear actuator 320 according to the sixth embodiment of the present invention, there is no outwardly projecting obstruction at all around the first fluid inlet/outlet ports 364a, 364b and the second fluid inlet/outlet ports 365a, 365b when piping operation is performed. Therefore, the tube fittings can be conveniently connected to the first fluid inlet/outlet ports 364a, 364b and the second fluid inlet/outlet ports 365a, 365b.

Next, a linear actuator 430 according to a seventh embodiment of the present invention is shown in FIGS. 32 to 35. In the following embodiments, the same constitutive elements as those of the linear actuator 320 according to the sixth embodiment will be designated by the same reference numerals, and only different constitutive elements will be explained.

In the case of the linear actuator 430 according to the seventh embodiment, a sensor-attaching rail 442 is provided with a pair of first screw holes 434 each of which has an orifice 432 with a reduced diameter at one end and communicates with the first fluid inlet/outlet ports 364a, 364b (second fluid inlet/outlet ports 365a, 365b), and a pair of second screw holes 440 into each of which a set screw 438 having a tapered section 436 at its front end is screwed.

Namely, in the case of the linear actuator 320 according to the sixth embodiment, the set screw 406 has the passage 410 formed therein so that the set screw 406 has both of the function to fix the sensor-attaching rail 326 to the main cylinder body 322 and the function to supply the pressurized fluid to the first fluid inlet/outlet ports 364a, 364b (second fluid inlet/outlet ports 365a, 365b). However, the linear actuator 430 according to the seventh embodiment is different from the linear actuator 320 according to the sixth embodiment in that the respective functions are separated from each other.

In this embodiment, unillustrated tube fittings for connecting tubes communicating with a fluid pressure supply source are screwed into the first screw holes 434. On the other hand, the set screws 438 are screwed into the second screw holes 440. The tapered sections 436 press the outer wall surface of the main cylinder body 322 in accordance with the screwing action of the set screws 438. Thus the sensor-attaching rail 442 is positioned and held on the main cylinder body 322.

Screw holes 446 for screwing set screws 438 are formed to penetrate through a plate 444. The plate 444 is positioned and held at a predetermined position on the main cylinder body 322 by means of the set screws 438 screwed into the screw holes 446.

Reference numeral 448 indicates ring-shaped seal packings. The seal packings 448, which are installed to circular recesses 449 of the sensor-attaching rail 442, function to hold connecting sections between the orifices 432 and the first fluid inlet/outlet ports 364a, 364b (second fluid inlet/outlet ports 365a, 365b) in an air-tight manner. On the other hand, the seal packings 448, which are installed to circular recesses 449 of the plate 444, function to close the second fluid inlet/outlet ports 365a, 365b (first fluid inlet/outlet ports 364a, 364b) in an air-tight manner.

Figure 36:
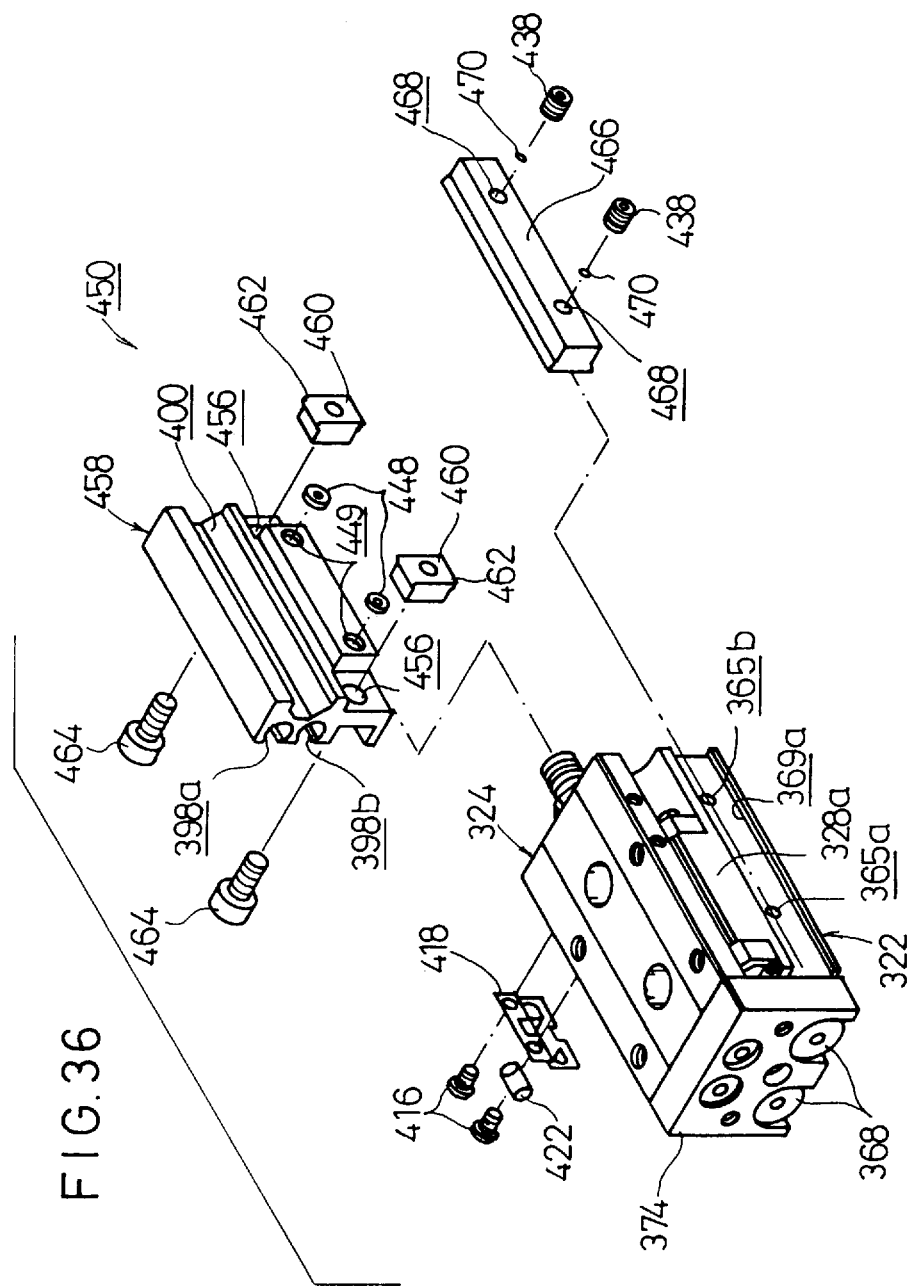
FIG. 36 shows an exploded perspective view illustrating a linear actuator according to an eighth embodiment of the present invention.
Figure 37:
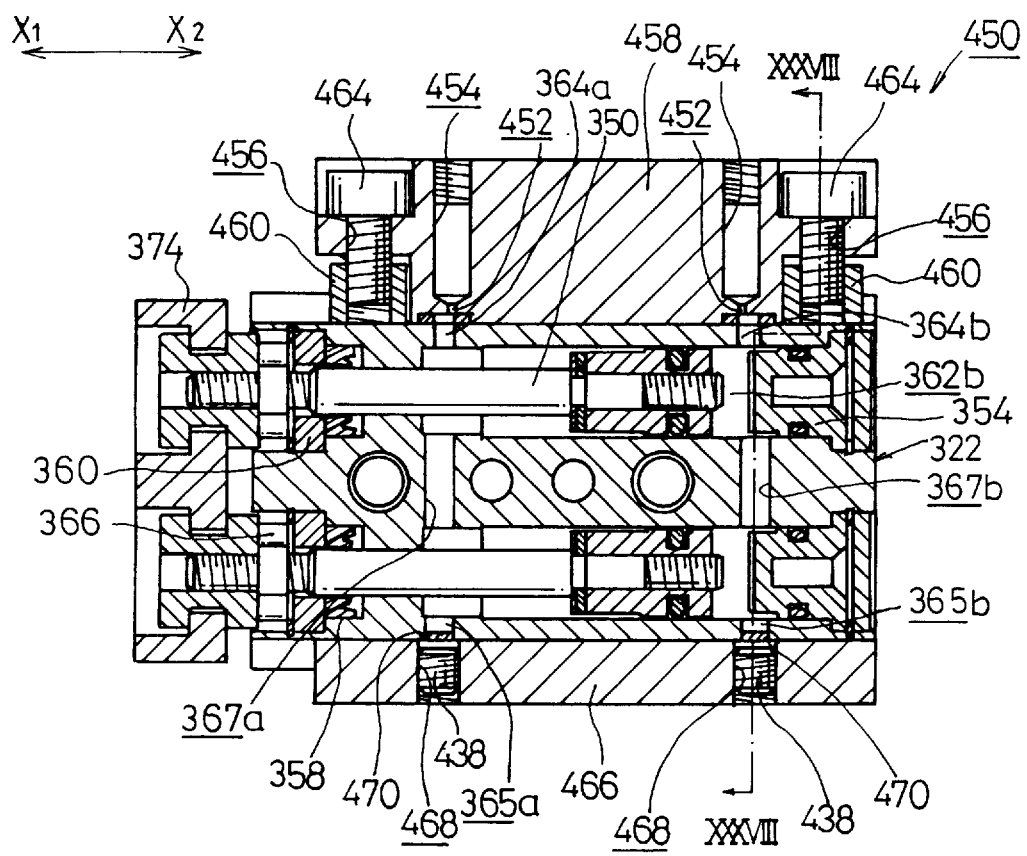
FIG. 37 shows a lateral cross-sectional view illustrating the linear actuator shown in FIG. 36.
Figure 38:
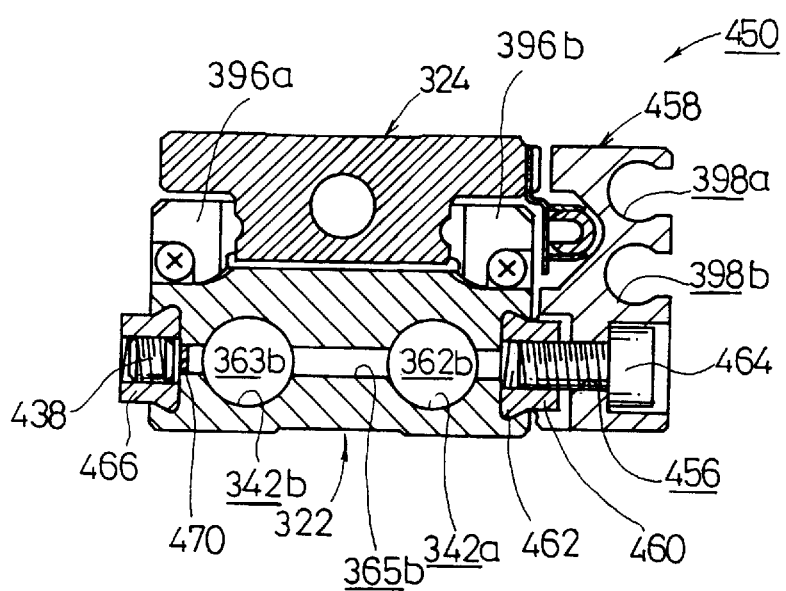
FIG. 38 shows a vertical cross-sectional view taken along a line XXXVIII—XXXVIII in FIG. 37.

Next, a linear actuator 450 according to an eighth embodiment of the present invention is shown in FIGS. 36 to 38.

In the case of the linear actuator 450 according to the eighth embodiment, a sensor-attaching rail 458 is formed with a pair of screw holes 454 each of which has an orifice 452 with a reduced diameter at one end and communicates with the first fluid inlet/outlet ports 364a, 364b (second fluid inlet/outlet ports 365a, 365b), and a pair of bolt-attaching holes 456 so that the screw holes 454 and the bolt-attaching holes penetrate through the sensor-attaching rail 458. A pair of fixing blocks 460 are separately formed, which are inserted and fitted along the grooves 369a, 369b of the main cylinder body 322. A locking section 462, which is wide in width in the vertical direction corresponding to the shape of the grooves 369a, 369b, is formed on each of the fixing blocks 460.

In this embodiment, the pair of fixing blocks 460 are tightened by using bolts 464 inserted into the bolt-attaching holes 456. Thus the sensor-attaching rail 458 is positioned and held on the main cylinder body 322.

Screw holes 468 for screwing set screws 438 thereinto are formed to penetrate through the plate 466. The set screws 438 are screwed into the screw holes 468. The second fluid inlet/outlet ports 365a, 365b (first fluid inlet/outlet ports 364a, 364b) are closed in an air-tight manner by means of packings 470 engaged with front ends of the set screws 438.

The linear actuator 430 according to the seventh embodiment and the linear actuator 450 according to the eighth embodiment are different from the linear actuator 320 according to the sixth embodiment in that the set screws and the bolts are attached from the outer sides of the sensor-attaching rail 442 and the plate 44.

The linear actuators 430, 450 according to the seventh and eighth embodiments have their function and effect which are equivalent to those of the linear actuator 320 according to the sixth embodiment, explanation of which is omitted.

What is claimed is:

1. A linear actuator comprising:

a cylinder mechanism including a main cylinder body defined with a through hole penetrating through said main cylinder body in its axial direction, for reciprocating a slide table in accordance with a displacement action of a piston arranged slidably along a cylinder chamber defined in said through hole;

a guide mechanism for guiding said slide table along said axial direction of said main cylinder body, including a guide section formed along said axial direction to protrude from a bottom surface of said slide table or from an upper surface of said main cylinder body, and a pair of guide blocks formed mutually opposingly and separated from each other by a predetermined spacing distance on said upper surface of said main cylinder body or on said bottom surface of said slide table;

an attachment member for selectively attaching said main cylinder body to another member in any direction of attachment from a side of said slide table or from a side of said main cylinder body; and a displacement amount-adjusting member for adjusting an amount of displacement of said slide table, provided in a cutout defined in one of said slide table and said main cylinder body, thereby providing a space between an underside of said slide table and an upper surface of said main cylinder body, said displacement amount-adjusting member further comprising an adjuster bolt which is connected at a substantially central position on said slide table and which is displaceable integrally with said slide table along said axial direction and through said cutout.

2. The linear actuator according to claim 1, wherein said displacement amount-adjusting member comprises a stopper block for regulating said amount of displacement of said slide table in accordance with abutment of said adjuster bolt, and wherein said amount of displacement of said slide table is adjusted in accordance with increase or decrease in a screwing amount of said adjuster bolt.

3. The linear actuator according to claim 1, wherein said attachment member includes through holes which are defined at substantially central positions of said slide table, and attachment holes which communicate with said through holes and which are formed to penetrate through said main cylinder body in a direction substantially perpendicular to said axial direction of said main cylinder body, and wherein a through hole defined in said cylinder body is formed and deviated by a predetermined distance from an axis of said main cylinder body toward a side in a transverse direction.

4. The linear actuator according to claim 2, wherein a buffer member composed of a resilient member is provided at one end of said adjuster bolt which abuts against said stopper block.

5. The linear actuator according to claim 1, wherein said guide mechanism includes rolling elements for rolling through an endless circulating track formed along said guide section and said guide blocks, and said endless circulating track is defined by a ball-circulating hole and a ball-rolling groove.

6. The linear actuator according to claim 5, wherein said guide mechanism includes said guide section formed to protrude from said bottom surface of said slide table, and said pair of guide blocks formed mutually opposingly and separated from each other by said predetermined spacing distance on said upper surface of said main cylinder body with said guide section being interposed there between, wherein said ball-rolling grooves are formed at sliding sections between said guide blocks and said guide section slidable through said rolling elements respectively, and wherein said ball-circulating holes are defined along said axial direction in said respective guide blocks.

7. The linear actuator according to claim 5, wherein said guide mechanism includes said guide section formed to protrude from said bottom surface of said slide table and said pair of guide blocks formed mutually opposingly and separated from each other by said predetermined spacing distance on said upper surface of said main cylinder body with said guide section being interposed therebetween, wherein said ball-rolling grooves are formed at sliding sections between said guide blocks and said guide section slidable through said rolling elements respectively, and wherein said ball circulating holes are defined substantially in parallel to one another through said guide section.

8. The linear actuator according to claim 5, wherein said guide mechanism includes said guide section formed to protrude from upper surface of said main cylinder body, and said pair of guide blocks formed mutually opposingly and separated from each other by said predetermined spacing distance on said bottom surface of said slide table, wherein said ball-rolling grooves are formed at sliding sections between said guide blocks and said guide section slidable through said rolling elements respectively, and wherein said ball-circulating holes are defined in said axial direction.

9. The linear actuator according to claim 8, wherein a pair of ball-circulating holes, which extend in said axial direction, are defined substantially in parallel to one another through said guide section.

10. A linear actuator comprising:
   a main cylinder body including a cylinder chamber formed therein;
   a slide table reciprocatable along an axial direction of said main cylinder body;
   a cylinder mechanism for reciprocating said slide table in accordance with a displacement action of a piston arranged slidably along said cylinder chamber;
   a guide mechanism for guiding said slide table along said axial direction of said main cylinder body, said guide mechanism being attached to said main cylinder body and having a flat guide block formed with a passage for circulating a plurality of rolling elements in accordance with a rolling action; and
   a holding member for holding said guide block on said main cylinder body, said holding member being interposed between said main cylinder body and said guide block, wherein said holding member comprises a pair of bolt members threadedly attaching said guide block to said main cylinder body, and a pair of pin members inserted and fitted into pin-inserting holes formed in said main cylinder body and said guide block respectively, said pin members being laterally offset from an axial line on which said bolt members are positioned.

11. The linear actuator according to claim 10, wherein a pair of protrusions projecting along said axial direction are formed, one at each end of said guide block.

12. The linear actuator according to claim 10, wherein said main cylinder body is provided with a displacement amount-adjusting member for adjusting an amount of displacement of said slide table.

13. A linear actuator comprising:
   a main cylinder body including a cylinder chamber communicating with fluid inlet/outlet ports, and grooves formed on side surfaces to extend along an axial direction;
   a slide table reciprocatable along said axial direction of said main cylinder body;
   a cylinder mechanism for reciprocating said slide table in accordance with a displacement action of a piston arranged slidably along said cylinder chamber; and
   a block member formed with an elongated groove for installing a sensor at a predetermined position and provided with a locking section to be inserted and fitted along one of said grooves and held by one of said grooves, said block member including a fixing member for fixing said block member at a predetermined position on said side surface of said main cylinder body;
   wherein said fixing member includes attachment members to be inserted into holes formed to penetrate through said block member, and passages for communicating with said fluid inlet/outlet ports are formed through said attachment members.

14. The linear actuator according to claim 13, wherein said fixing member comprises one of the set screws to be screwed into screw holes and fixing blocks to be fastened by means of bolts.

15. The linear actuator according to claim 13, wherein said locking section is formed integrally with said block member, or said locking section is formed on a fixing block provided separately from said block member.

16. The linear actuator according to claim 13, wherein one side surface of said block member is formed to have a cutout so that a magnetic member affixed to said slide table faces said cutout.

17. The linear actuator according to claim 13, wherein a guide mechanism for guiding said slide table along said axial direction of said main cylinder body is provided between said main cylinder body and said slide table.

18. The linear actuator according to claim 13, further comprising a displacement amount-adjusting member for adjusting an amount of displacement of said slide table, provided at a central position on one end of said slide table.

19. The linear actuator according to claim 13, further comprising an attachment member for selectively attaching said main cylinder body to another member in any direction of attachment from a side of said slide table or from a side of said main cylinder body.

20. A linear actuator comprising:
   a main cylinder body including a cylinder chamber communicating with fluid inlet/outlet ports, and grooves formed on side surfaces to extend along an axial direction;
   a slide table reciprocatable along said axial direction of said main cylinder body;
   a cylinder mechanism for reciprocating said slide table in accordance with a displacement action of a piston arranged slidably along said cylinder chamber; and a block member formed with an elongated groove for installing a sensor at a predetermined position and provided with a locking section to be inserted and fitted along one of said grooves and held by one of said grooves;

wherein said grooves are formed on said pair of mutually opposing side surfaces of said main cylinder body, said block member is fixed to said groove on one of said side surfaces of said main cylinder body by means of a fixing member, a closing plate for closing said fluid inlet/outlet ports is fixed to said groove on the other of said side surfaces, and said block member and said closing plate are interchangeable to one another.

\* \* \* \* \*